United States Patent
Choi et al.

(10) Patent No.: US 10,356,756 B2
(45) Date of Patent: Jul. 16, 2019

(54) DATA TRANSMISSION METHOD AND DEVICE IN WIRELESS COMMUNICATION SYSTEM

(71) Applicant: LG ELECTRONICS INC., Seoul (KR)

(72) Inventors: Hyeyoung Choi, Seoul (KR); Kiseon Ryu, Seoul (KR); Jeongki Kim, Seoul (KR); Hangyu Cho, Seoul (KR); Suhwook Kim, Seoul (KR)

(73) Assignee: LG ELECTRONICS INC., Seoul (KR)

(*) Notice: Subject to any disclaimer, the term of this patent is extended or adjusted under 35 U.S.C. 154(b) by 68 days.

(21) Appl. No.: 15/525,038

(22) PCT Filed: Nov. 16, 2015

(86) PCT No.: PCT/KR2015/012262
§ 371 (c)(1),
(2) Date: May 5, 2017

(87) PCT Pub. No.: WO2017/034081
PCT Pub. Date: Mar. 2, 2017

(65) Prior Publication Data
US 2018/0124746 A1    May 3, 2018

Related U.S. Application Data

(60) Provisional application No. 62/207,936, filed on Aug. 21, 2015.

(51) Int. Cl.
*H04W 72/04*    (2009.01)
*H04W 52/02*    (2009.01)
(Continued)

(52) U.S. Cl.
CPC .......... *H04W 72/04* (2013.01); *H04L 5/0055* (2013.01); *H04W 74/04* (2013.01); *H04W 84/12* (2013.01);
(Continued)

(58) Field of Classification Search
CPC ..... H04W 72/04; H04W 84/12; H04W 74/04; H04L 5/0055
See application file for complete search history.

(56) References Cited

U.S. PATENT DOCUMENTS

| 2013/0070658 A1 | 3/2013 | Noh et al. |
| 2013/0095821 A1 | 4/2013 | Lim et al. |

(Continued)

FOREIGN PATENT DOCUMENTS

| KR | 20130073870 | 7/2013 |
| WO | 2009150027 | 12/2009 |
| WO | 2014087043 | 6/2014 |

OTHER PUBLICATIONS

PCT International Application No. PCT/KR2015/012262 Written Opinion of the International Searching Authority dated May 19, 2016, 9 pages.

(Continued)

*Primary Examiner* — Kiet Tang
(74) *Attorney, Agent, or Firm* — Lee Hong Degerman Kang Waimey

(57) ABSTRACT

A data transmission method of a station (STA) device in a wireless LAN system is disclosed. The data transmission method of an STA device, according to the present invention, comprises: a receiving step of receiving an uplink data frame from a first STA, wherein the uplink data frame includes first receiving operating mode information indicating a receiving operating mode to be changed by the first STA; and a transmitting step of transmitting an ACK frame (Continued)

for the uplink data frame, wherein the ACK frame includes mode change acceptance information indicating whether to accept or reject the change in the receiving operating mode according to the receiving operating mode information.

12 Claims, 19 Drawing Sheets

(51) Int. Cl.
  *H04L 1/00* (2006.01)
  *H04W 72/12* (2009.01)
  *H04L 5/00* (2006.01)
  *H04W 84/12* (2009.01)
  *H04W 74/04* (2009.01)

(52) U.S. Cl.
  CPC .............. *Y02D 70/00* (2018.01); *Y02D 70/10* (2018.01); *Y02D 70/12* (2018.01); *Y02D 70/122* (2018.01); *Y02D 70/126* (2018.01); *Y02D 70/1224* (2018.01); *Y02D 70/1242* (2018.01); *Y02D 70/1262* (2018.01); *Y02D 70/1264* (2018.01); *Y02D 70/14* (2018.01); *Y02D 70/142* (2018.01); *Y02D 70/146* (2018.01); *Y02D 70/20* (2018.01); *Y02D 70/21* (2018.01); *Y02D 70/22* (2018.01)

(56) References Cited

U.S. PATENT DOCUMENTS

| | | |
|---|---|---|
| 2014/0247824 A1 | 9/2014 | Sohn et al. |
| 2015/0124689 A1 | 5/2015 | Merlin et al. |
| 2015/0173014 A1* | 6/2015 | Lee .................. H04W 52/0216 370/311 |
| 2016/0065327 A1* | 3/2016 | Asterjadhi ............ H04L 1/0003 370/329 |
| 2016/0198358 A1* | 7/2016 | Rong ................ H04W 72/1268 370/235 |

OTHER PUBLICATIONS

European Patent Office Application Serial No. 15902353.0, Search Report dated May 28, 2019, 12 pages.

Kiseon Ryu, et al, "UL MU Procedure", IEE 802.11-15/0365r0, Mar. 9, 2019, 16 pages.

* cited by examiner

【Figure 1】
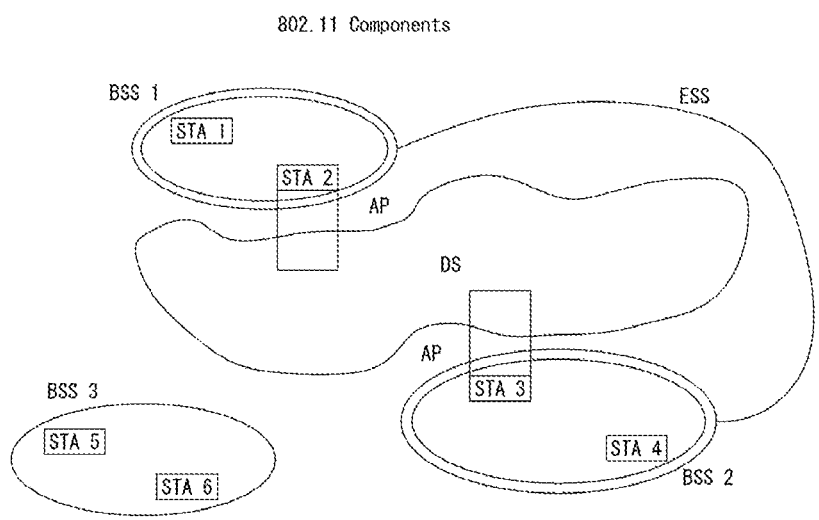

[Figure 2]
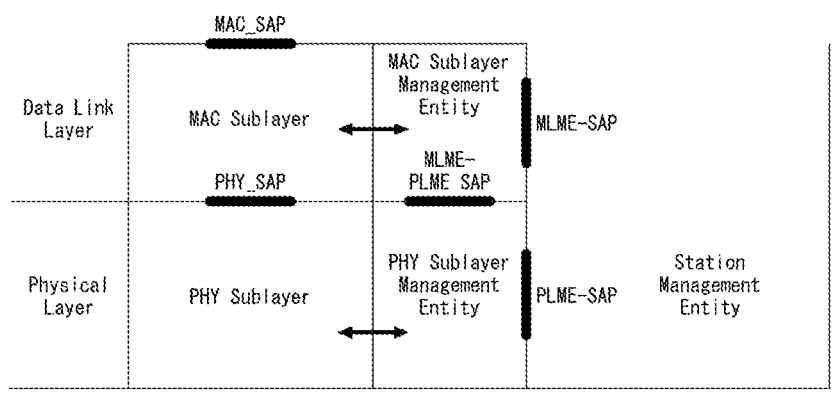

[Figure 3]
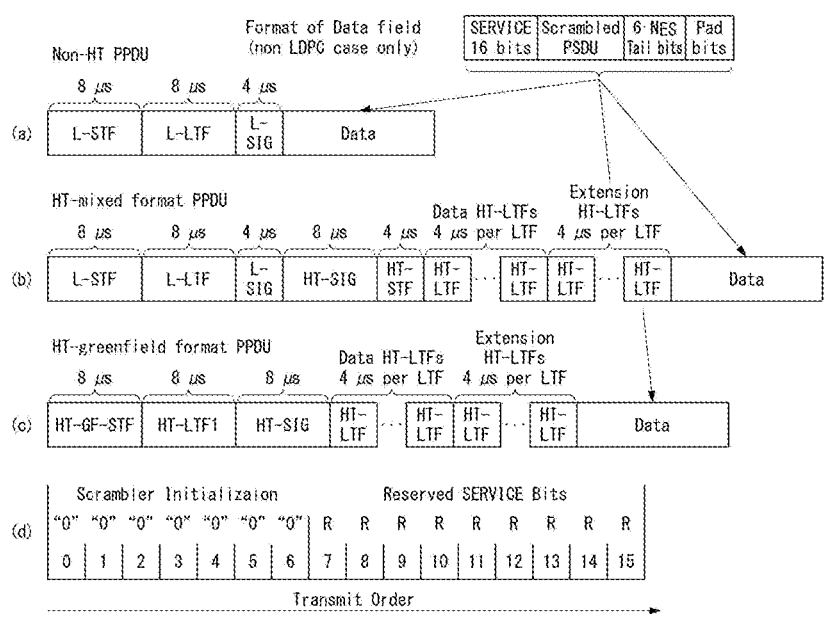

[Figure 4]
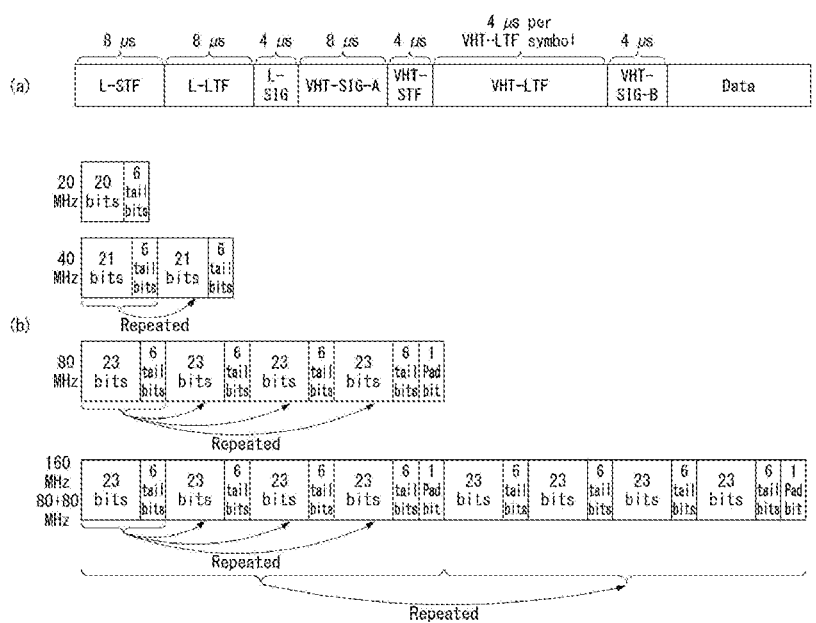

[Figure 5]
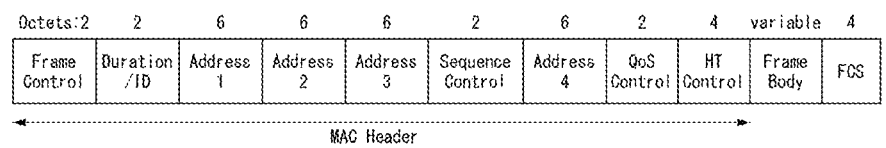

[Figure 6]

| B0 B1 | B2 B3 | B4 B7 | B8 | B9 | B10 | B11 | B12 | B13 | B14 | B15 |
|---|---|---|---|---|---|---|---|---|---|---|
| Protocol Version | Type | Subtype | To DS | From DS | More Frag- ments | Retry | Power Management | More Data | Protected Frame | Order |
| Bits: 2 | 2 | 4 | 1 | 1 | 1 | 1 | 1 | 1 | 1 | 1 |

【Figure 7】
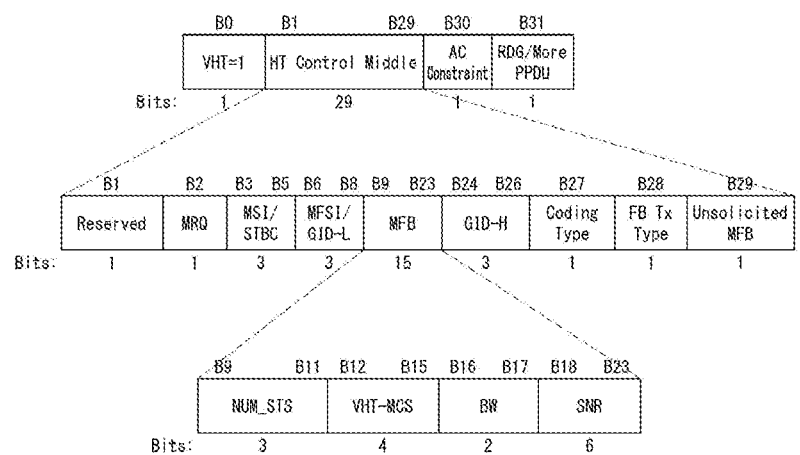

[Figure 8]
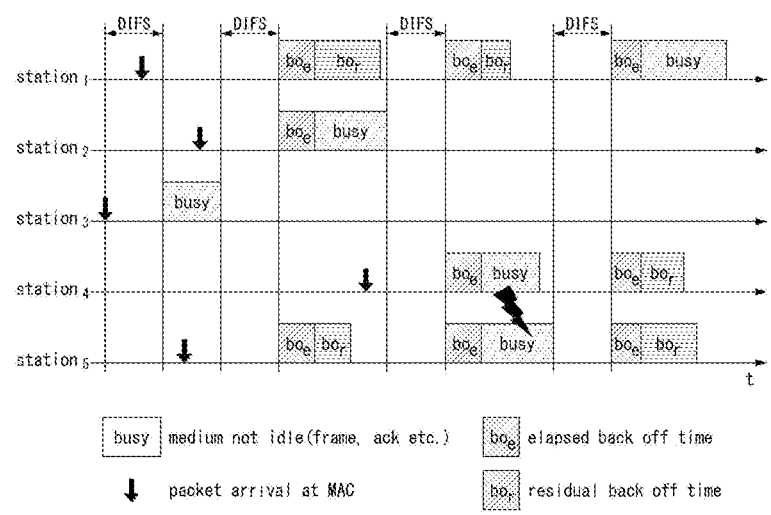

[Figure 9]
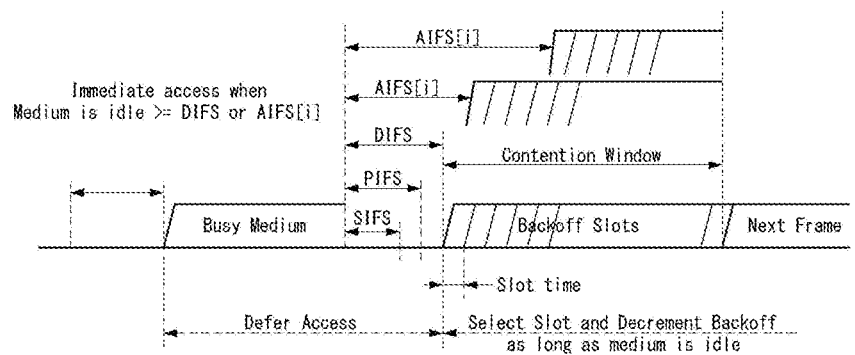

【Figure 10】
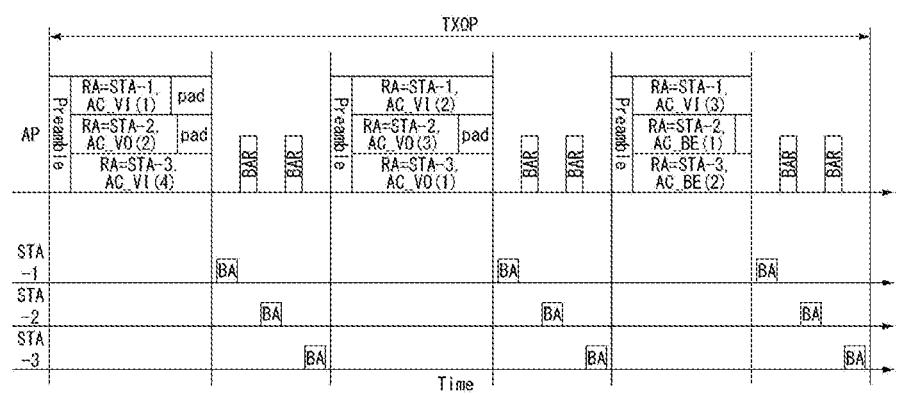

【Figure 11】
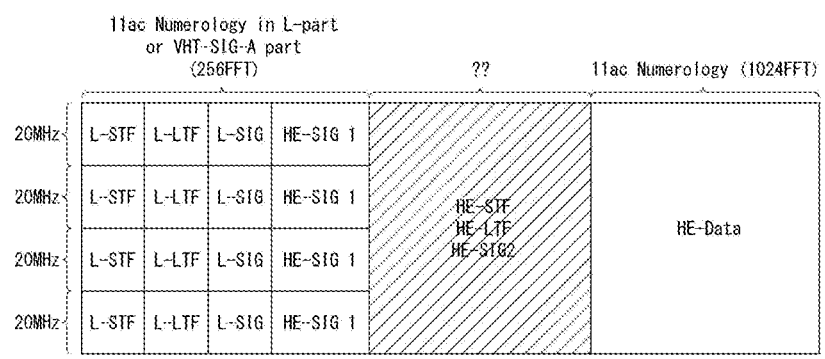

【Figure 12】

| 20MHz | L-STF | L-LTF | L-SIG | HE-SIG 1 | HE-STF | HE-LTF | HE-SIG2 | HE-Data(SU/MU) |
|---|---|---|---|---|---|---|---|---|
| 20MHz | L-STF | L-LTF | L-SIG | HE-SIG 1 | HE-STF | HE-LTF | HE-SIG2 | HE-Data(SU/MU) |
| 20MHz | L-STF | L-LTF | L-SIG | HE-SIG 1 | | | | |
| 20MHz | L-STF | L-LTF | L-SIG | HE-SIG 1 | HE-STF | HE-LTF | HE-SIG2 | HE-Data(SU/MU) |

【Figure 13】

| 20MHz | L-STF | L-LTF | L-SIG | HE-SIG 1 |          | HE-STF | HE-LTF | HE-Data(SU/MU) |
|-------|-------|-------|-------|----------|----------|--------|--------|----------------|
| 20MHz | L-STF | L-LTF | L-SIG | HE-SIG 1 | HE-SIG 2 | HE-STF | HE-LTF | HE-Data(SU/MU) |
| 20MHz | L-STF | L-LTF | L-SIG | HE-SIG 1 |          | HE-STF | HE-LTF | HE-Data(SU/MU) |
| 20MHz | L-STF | L-LTF | L-SIG | HE-SIG 1 |          |        |        |                |

【Figure 14】
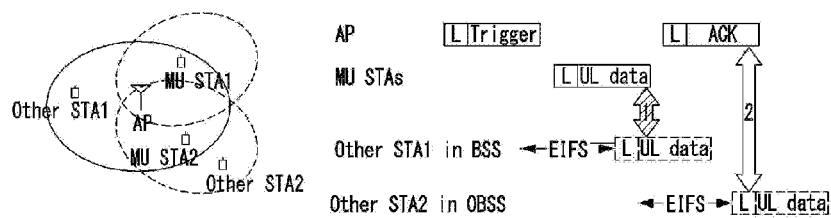
【Figure 15】
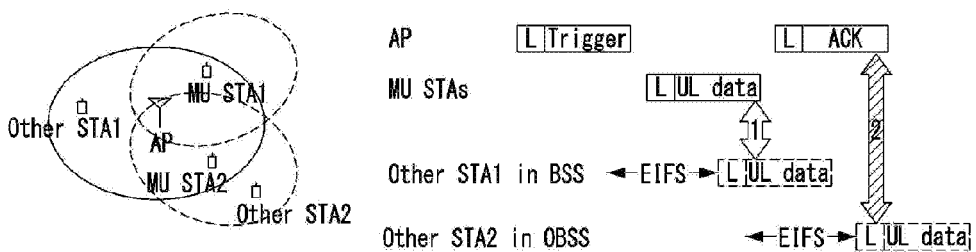
【Figure 16】
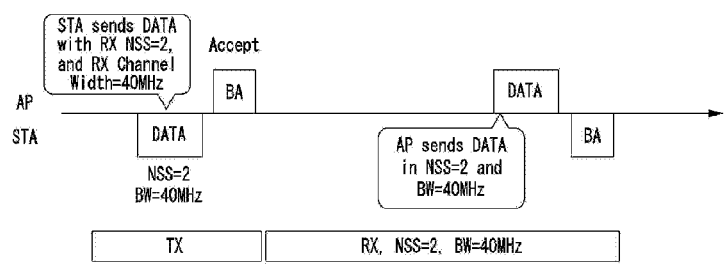

【Figure 17】
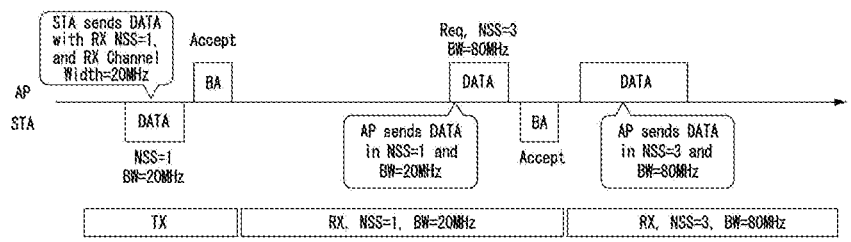

【Figure 18】
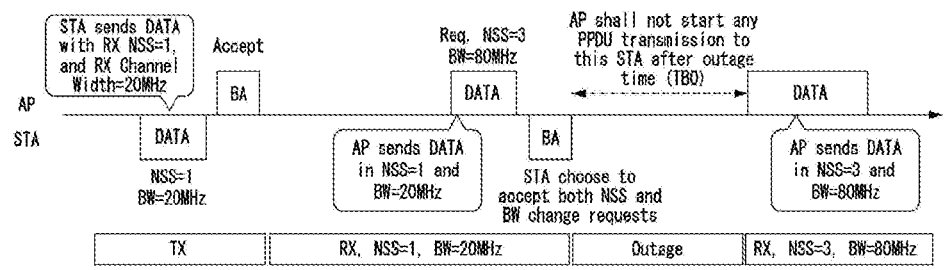

[Figure 19]
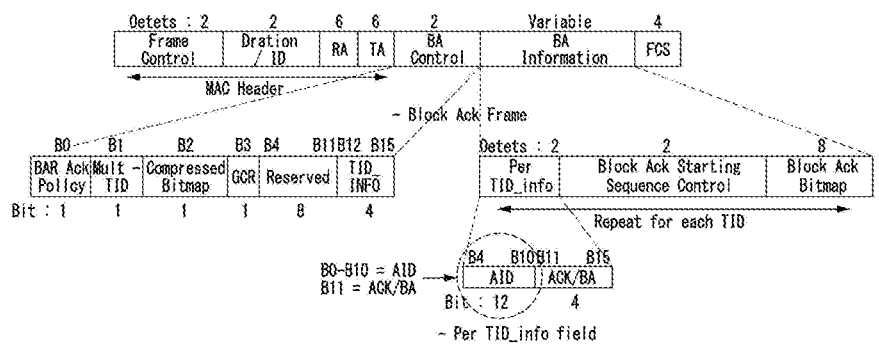

【Figure 20】
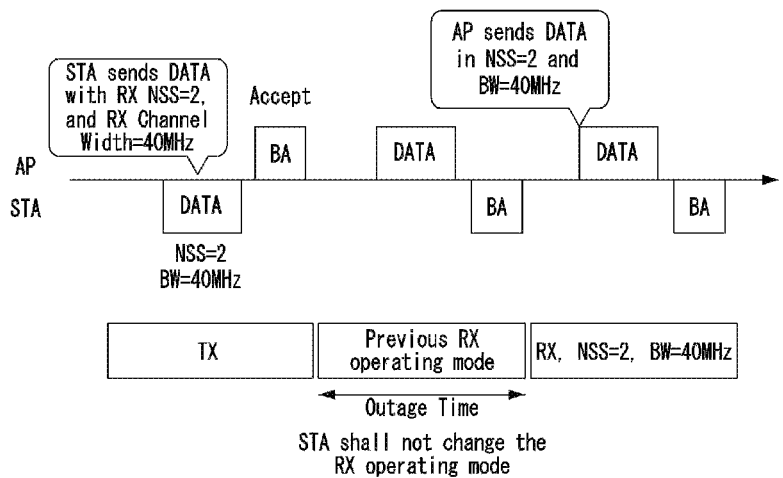
【Figure 21】
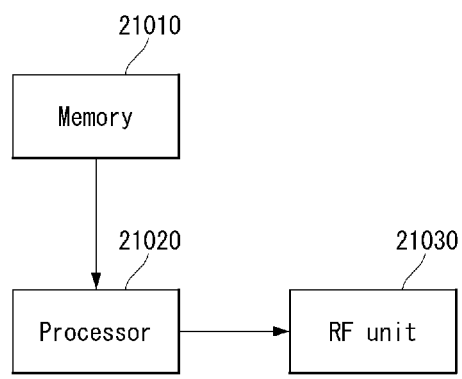

【Figure 22】
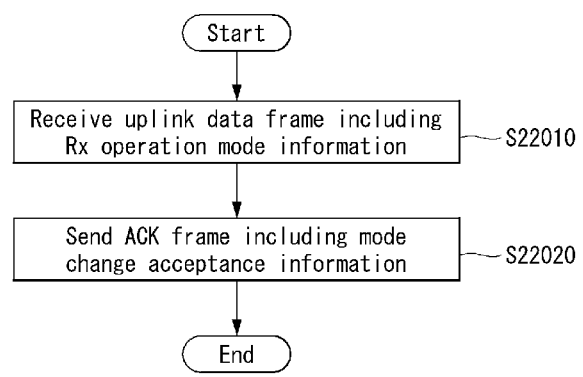

DATA TRANSMISSION METHOD AND DEVICE IN WIRELESS COMMUNICATION SYSTEM

CROSS-REFERENCE TO RELATED APPLICATIONS

This application is the National Stage filing under 35 U.S.C. 371 of International Application No. PCT/KR2015/012262, filed on Nov. 16, 2015, which claims the benefit of U.S. Provisional Application No. 62/207,936, filed Aug. 21, 2015, the contents of which are hereby incorporated by reference herein in its entirety.

TECHNICAL FIELD

The present invention relates to a wireless communication system and, more particularly, to a station (STA) device for sending a signal by adding a padding symbol so that a receiver can secure a signal processing time depending on an increase in the FFT size of transmitted data in a wireless local area network (WLAN) communication system and a method for sending, by the STA device, data.

BACKGROUND ART

Wi-Fi is a wireless local area network (WLAN) technology which enables a device to access the Internet in a frequency band of 2.4 GHz, 5 GHz or 60 GHz.

A WLAN is based on the institute of electrical and electronic engineers (IEEE) 802.11 standard. The wireless next generation standing committee (WNG SC) of IEEE 802.11 is an ad-hoc committee which is worried about the next-generation wireless local area network (WLAN) in the medium to longer term.

IEEE 802.11n has an object of increasing the speed and reliability of a network and extending the coverage of a wireless network. More specifically, IEEE 802.11n supports a high throughput (HT) providing a maximum data rate of 600 Mbps. Furthermore, in order to minimize a transfer error and to optimize a data rate, IEEE 802.11n is based on a multiple inputs and multiple outputs (MIMO) technology in which multiple antennas are used at both ends of a transmission unit and a reception unit.

As the spread of a WLAN is activated and applications using the WLAN are diversified, in the next-generation WLAN system supporting a very high throughput (VHT), IEEE 802.11ac has been newly enacted as the next version of an IEEE 802.11n WLAN system. IEEE 802.11ac supports a data rate of 1 Gbps or more through 80 MHz bandwidth transmission and/or higher bandwidth transmission (e.g., 160 MHz), and chiefly operates in a 5 GHz band.

Recently, a need for a new WLAN system for supporting a higher throughput than a data rate supported by IEEE 802.11ac comes to the fore.

The scope of IEEE 802.11ax chiefly discussed in the next-generation WLAN task group called a so-called IEEE 802.11ax or high efficiency (HEW) WLAN includes 1) the improvement of an 802.11 physical (PHY) layer and medium access control (MAC) layer in bands of 2.4 GHz, 5 GHz, etc., 2) the improvement of spectrum efficiency and area throughput, 3) the improvement of performance in actual indoor and outdoor environments, such as an environment in which an interference source is present, a dense heterogeneous network environment, and an environment in which a high user load is present and so on.

A scenario chiefly taken into consideration in IEEE 802.11ax is a dense environment in which many access points (APs) and many stations (STAs) are present. In IEEE 802.11ax, the improvement of spectrum efficiency and area throughput is discussed in such a situation. More specifically, there is an interest in the improvement of substantial performance in outdoor environments not greatly taken into consideration in existing WLANs in addition to indoor environments.

In IEEE 802.11ax, there is a great interest in scenarios, such as wireless offices, smart homes, stadiums, hotspots, and buildings/apartments. The improvement of system performance in a dense environment in which many APs and many STAs are present is discussed based on the corresponding scenarios.

In the future, it is expected in IEEE 802.11ax that the improvement of system performance in an overlapping basic service set (OBSS) environment, the improvement of an outdoor environment, cellular offloading, and so on rather than single link performance improvement in a single basic service set (BSS) will be actively discussed. The directivity of such IEEE 802.11ax means that the next-generation WLAN will have a technical scope gradually similar to that of mobile communication. Recently, when considering a situation in which mobile communication and a WLAN technology are discussed together in small cells and direct-to-direct (D2D) communication coverage, it is expected that the technological and business convergence of the next-generation WLAN based on IEEE 802.11ax and mobile communication will be further activated.

DISCLOSURE

Technical Problem

As described above, a method for improving performance in the 802.11ax system, that is, the next-generation wireless LAN system, is actively discussed. More specifically, a method for improving resources use efficiency in a limited bandwidth is an important subject in the 802.11ax system.

In the 802.11ax system, for robust transmission in average throughput enhancement and outdoors, a symbol length four times longer than that in the legacy 802.11 system (e.g., 802.11a, 802.11n, and 802.11ac) is to be used. That is, when OFDM modulation is performed, an STA may use the four-times greater FFT size.

In order to enhance system throughput, an STA needs to change receive (Rx) operating mode while sending data. Furthermore, a case where an STA changes transmit (Tx) operating mode for a target communication STA may also be taken into consideration.

Technical Solution

Embodiments of the present invention propose an STA device in a WLAN system and a method for sending, by the STA device, data.

In an embodiment of the present invention, a method for transmitting, by a station (STA), data in a wireless LAN (WLAN) system includes receiving an uplink data frame from a first STA, the uplink data frame including first receive (Rx) operating mode information indicative of Rx operating mode to be changed by the first STA and sending an ACK frame for the uplink data frame, the ACK frame including mode change acceptance information indicative of an acceptance or denial of an Rx operating mode change according to the Rx operating mode information. The first Rx operating mode information includes received spatial stream number information and Rx channel bandwidth information.

In the method for sending, by an STA, data according to an embodiment of the present invention, the ACK frame may further include second Rx operating mode information for the first STA if the mode change acceptance information is indicative of the denial of the Rx operating mode change. The second Rx operating mode information may be indicative of Rx operating mode different from the first Rx operating mode.

In the method for sending, by an STA, data according to an embodiment of the present invention, the uplink data frame may include Tx operating mode information. The Tx operating mode information may be indicative of Tx operating mode of the STA which is to be received by the first STA.

In the method for sending, by an STA, data according to an embodiment of the present invention, the Tx operating mode information may include resource unit information indicative of a resource unit size by which the first STA is capable of accessing the STA.

The method for sending, by an STA, data according to an embodiment of the present invention may further include sending trigger information indicative of the transmission of the Rx operating mode information.

The method for sending, by an STA, data according to an embodiment of the present invention may further include initiating data transmission according to changed operating mode after the ACK frame is transmitted if the operating mode change according to the Rx operating mode information is accepted. The data transmission may be initiated after a delay time from the transmission of the ACK frame.

In the method for sending, by an STA, data according to an embodiment of the present invention, the ACK frame may include delay time information indicative of data transmission duration according to operating mode prior to a change after the ACK frame is transmitted.

Furthermore, a station (STA) device in a wireless LAN (WLAN) system according to an embodiment of the present includes a radio frequency (RF) unit transmitting and receiving a radio signal and a processor controlling the RF unit. The STA device receives an uplink data frame from a first STA and sends an ACK frame for the uplink data frame. Te uplink data frame includes first receive (Rx) operating mode information indicative of Rx operating mode to be changed by the first STA. The ACK frame includes mode change acceptance information indicative of an acceptance or denial of an Rx operating mode change according to the Rx operating mode information. The first Rx operating mode information includes received spatial stream number information and Rx channel bandwidth information.

Advantageous Effects

An STA according to an embodiment of the present invention can actively change the number of reception chains for power saving depending on the number of received spatial streams and a channel bandwidth when performing spatial multiplexing. More specifically, the STA can change Rx operating mode without a separate procedure, such as the transmission and reception of an additional frame, by sending a transmission data frame including Rx operating mode information to be changed.

Furthermore, an STA that has received a signal frame including Rx operating mode information may send information indicative of the acceptance or denial of an operating mode change using an ACK frame other than a separate frame. Furthermore, if an STA denies an operating mode change, it may additionally transmit information about another operating mode to be changed by the STA using an ACK frame.

Accordingly, in accordance with an embodiment of the present invention, system throughput can be enhanced because Rx operating mode of an STA can be changed through the transmission and reception of a common data frame and an ACK frame without a separate additional procedure.

Furthermore, if an STA is capable of communication with another STA (AP) using a specific resource unit size, it can communicate with the AP having wide coverage, such as an outdoors environment, by sending the resource unit size to another STA.

The Rx operating mode information may be transmitted, if necessary, or the transmission of the Rx operating mode information may be initiated by a trigger signal in order to enhance system throughput.

Furthermore, an STA that receives Rx operating mode information and changes operating mode can perform data transmission according to changed operating mode after a specific outage time, thereby being capable of preventing an error in the reception of a receiver. Furthermore, the flexibility of a system operation can be achieved by sending data in existing operating mode during a specific outage time and sending data in changed operating mode after the outage time, if necessary.

DESCRIPTION OF DRAWINGS

FIG. 1 is a diagram showing an example of an IEEE 802.11 system to which an embodiment of the present invention may be applied.

FIG. 2 is a diagram illustrating the configuration of layer architecture of an IEEE 802.11 system to which an embodiment of the present invention may be applied.

FIG. 3 illustrating a non-HT format PPDU and an HT format PPDU in a wireless communication system to which an embodiment of the present invention may be applied.

FIG. 4 illustrates a VHT format PPDU in a wireless communication system to which an embodiment of the present invention may be applied.

FIG. 5 illustrates the format of an MAC frame for an IEEE 802.11 system to which an embodiment of the present invention may be applied.

FIG. 6 is a diagram illustrating a frame control field within an MAC frame in a wireless communication system to which an embodiment of the present invention may be applied.

FIG. 7 illustrates the VHT format of an HT control field in a wireless communication system to which an embodiment of the present invention may be applied.

FIG. 8 is a diagram illustrating a random backoff period and a frame transmission procedure in a wireless communication system to which an embodiment of the present invention may be applied.

FIG. 9 is a diagram illustrating an IFS relation in a wireless communication system to which an embodiment of the present invention may be applied.

FIG. 10 is a diagram illustrating a downlink MU-MIMO transmission process in a wireless communication system to which an embodiment of the present invention may be applied.

FIG. 11 shows an HE PPDU format according to an embodiment of the present invention.

FIG. 12 shows an HE-PPDU format according to another embodiment of the present invention.

FIG. 13 shows an HE-PPDU format according to another embodiment of the present invention.

FIG. 14 shows the UL MU data transmission of an HE system according to an embodiment of the present invention.

FIG. 15 shows the UL MU data transmission of an HE system according to an embodiment of the present invention.

FIGS. 16 to 18 show the transmission of information by an STA in Rx operating mode according to an embodiment of the present invention.

FIG. 19 shows a multi-STA BA frame format according to an embodiment of the present invention.

FIG. 20 shows the transmission of Rx operating mode information and a method for sending data in Rx operating mode according to an embodiment of the present invention.

FIG. 21 shows an STA device according to an embodiment of the present invention.

FIG. 22 shows a method for sending, by an STA device, data according to an embodiment of the present invention.

MODE FOR INVENTION

Hereinafter, some embodiments of the present invention are described in detail with reference to the accompanying drawings. The detailed description to be disclosed herein along with the accompanying drawings is provided to describe exemplary embodiments of the present invention and is not intended to describe a sole embodiment in which the present invention may be implemented. The following detailed description includes detailed contents in order to provide complete understanding of the present invention. However, those skilled in the art will appreciate that the present invention may be implemented even without such detailed contents.

In some cases, in order to avoid making the concept of the present invention vague, the known structure and/or device may be omitted or may be illustrated in the form of a block diagram based on the core function of each structure and/or device.

Furthermore, specific terms used in the following description are provided to help understanding of the present invention, and such specific terms may be changed into other forms without departing from the technical spirit of the present invention.

The following technologies may be used in a variety of wireless communication systems, such as code division multiple access (CDMA), frequency division multiple access (FDMA), time division multiple access (TDMA), orthogonal frequency division multiple access (OFDMA), single carrier frequency division multiple access (SC-FDMA), and non-orthogonal multiple access (NOMA). CDMA may be implemented using a radio technology, such as universal terrestrial radio access (UTRA) or CDMA2000. TDMA may be implemented using a radio technology, such as global system for Mobile communications (GSM)/general packet radio service (GPRS)/enhanced data rates for GSM evolution (EDGE). OFDMA may be implemented using a radio technology, such as institute of electrical and electronics engineers (IEEE) 802.11 (Wi-Fi), IEEE 802.16 (WiMAX), IEEE 802.20, or evolved UTRA (E-UTRA). UTRA is part of a universal mobile telecommunications system (UMTS). $3^{rd}$ generation partnership project (3GPP) long term evolution (LTE) is part of an evolved UMTS (E-UMTS) using evolved UMTS terrestrial radio access (E-UTRA), and it adopts OFDMA in downlink and adopts SC-FDMA in uplink. LTE-advanced (LTE-A) is the evolution of 3GPP LTE.

Embodiments of the present invention may be supported by the standard documents disclosed in at least one of IEEE 802, 3GPP, and 3GPP2, that is, radio access systems. That is, steps or portions that belong to the embodiments of the present invention and that are not described in order to clearly expose the technical spirit of the present invention may be supported by the documents. Furthermore, all terms disclosed in this document may be described by the standard documents.

In order to more clarify a description, IEEE 802.11 is mainly described, but the technical characteristics of the present invention are not limited thereto.

General System

FIG. 1 is a diagram showing an example of an IEEE 802.11 system to which an embodiment of the present invention may be applied.

The IEEE 802.11 configuration may include a plurality of elements. There may be provided a wireless communication system supporting transparent station (STA) mobility for a higher layer through an interaction between the elements. A basic service set (BSS) may correspond to a basic configuration block in an IEEE 802.11 system.

FIG. 1 illustrates that three BSSs BSS 1 to BSS 3 are present and two STAs (e.g., an STA 1 and an STA 2 are included in the BSS 1, an STA 3 and an STA 4 are included in the BSS 2, and an STA 5 and an STA 6 are included in the BSS 3) are included as the members of each BSS.

In FIG. 1, an ellipse indicative of a BSS may be interpreted as being indicative of a coverage area in which STAs included in the corresponding BSS maintain communication. Such an area may be called a basic service area (BSA). When an STA moves outside the BSA, it is unable to directly communicate with other STAs within the corresponding BSA.

In the IEEE 802.11 system, the most basic type of a BSS is an independent a BSS (IBSS). For example, an IBSS may have a minimum form including only two STAs. Furthermore, the BSS 3 of FIG. 1 which is the simplest form and from which other elements have been omitted may correspond to a representative example of the IBSS. Such a configuration may be possible if STAs can directly communicate with each other. Furthermore, a LAN of such a form is not previously planned and configured, but may be configured when it is necessary. This may also be called an ad-hoc network.

When an STA is powered off or on or an STA enters into or exits from a BSS area, the membership of the STA in the BSS may be dynamically changed. In order to become a member of a BSS, an STA may join the BSS using a synchronization process. In order to access all of services in a BSS-based configuration, an STA needs to be associated with the BSS. Such association may be dynamically configured, and may include the use of a distribution system service (DSS).

In an 802.11 system, the distance of a direct STA-to-STA may be constrained by physical layer (PHY) performance In any case, the limit of such a distance may be sufficient, but communication between STAs in a longer distance may be required, if necessary. In order to support extended coverage, a distribution system (DS) may be configured.

The DS means a configuration in which BSSs are interconnected. More specifically, a BSS may be present as an element of an extended form of a network including a plurality of BSSs instead of an independent BSS as in FIG. 1.

The DS is a logical concept and may be specified by the characteristics of a distribution system medium (DSM). In the IEEE 802.11 standard, a wireless medium (WM) and a distribution system medium (DSM) are logically divided. Each logical medium is used for a different purpose and used by a different element. In the definition of the IEEE 802.11 standard, such media are not limited to the same one and are also not limited to different ones. The flexibility of the configuration (i.e., a DS configuration or another network configuration) of an IEEE 802.11 system may be described in that a plurality of media is logically different as described above. That is, an IEEE 802.11 system configuration may be implemented in various ways, and a corresponding system configuration may be independently specified by the physical characteristics of each implementation example.

The DS can support a mobile device by providing the seamless integration of a plurality of BSSs and providing logical services required to handle an address to a destination.

An AP means an entity which enables access to a DS through a WM with respect to associated STAs and has the STA functionality. The movement of data between a BSS and the DS can be performed through an AP. For example, each of the STA 2 and the STA 3 of FIG. 1 has the functionality of an STA and provides a function which enables associated STAs (e.g., the STA 1 and the STA 4) to access the DS. Furthermore, all of APs basically correspond to an STA, and thus all of the APs are entities capable of being addressed. An address used by an AP for communication on a WM and an address used by an AP for communication on a DSM may not need to be necessarily the same.

Data transmitted from one of STAs, associated with an AP, to the STA address of the AP may be always received by an uncontrolled port and processed by an IEEE 802.1X port access entity. Furthermore, when a controlled port is authenticated, transmission data (or frame) may be delivered to a DS.

A wireless network having an arbitrary size and complexity may include a DS and BSSs. In an IEEE 802.11 system, a network of such a method is called an extended service set (ESS) network. The ESS may correspond to a set of BSSs connected to a single DS. However, the ESS does not include a DS. The ESS network is characterized in that it looks like an IBSS network in a logical link control (LLC) layer. STAs included in the ESS may communicate with each other. Mobile STAs may move from one BSS to the other BSS (within the same ESS) in a manner transparent to the LLC layer.

In an IEEE 802.11 system, the relative physical positions of BSSs in FIG. 1 are not assumed, and the following forms are all possible.

More specifically, BSSs may partially overlap, which is a form commonly used to provide consecutive coverage. Furthermore, BSSs may not be physically connected, and logically there is no limit to the distance between BSSs. Furthermore, BSSs may be placed in the same position physically and may be used to provide redundancy. Furthermore, one (or one or more) IBSS or ESS networks may be physically present in the same space as one or more ESS networks. This may correspond to an ESS network form if an ad-hoc network operates at the position in which an ESS network is present, if IEEE 802.11 networks that physically overlap are configured by different organizations, or if two or more different access and security policies are required at the same position.

In a WLAN system, an STA is an apparatus operating in accordance with the medium access control (MAC)/PHY regulations of IEEE 802.11. An STA may include an AP STA and a non-AP STA unless the functionality of the STA is not individually different from that of an AP. In this case, assuming that communication is performed between an STA and an AP, the STA may be interpreted as being a non-AP STA. In the example of FIG. 1, the STA 1, the STA 4, the STA 5, and the STA 6 correspond to non-AP STAs, and the STA 2 and the STA 3 correspond to AP STAs.

A non-AP STA corresponds to an apparatus directly handled by a user, such as a laptop computer or a mobile phone. In the following description, a non-AP STA may also be called a wireless device, a terminal, user equipment (UE), a mobile station (MS), a mobile terminal, a wireless terminal, a wireless transmit/receive unit (WTRU), a network interface device, a machine-type communication (MTC) device, a machine-to-machine (M2M) device or the like.

Furthermore, an AP is a concept corresponding to a base station (BS), a node-B, an evolved Node-B (eNB), a base transceiver system (BTS), a femto BS or the like in other wireless communication fields.

Hereinafter, in this specification, downlink (DL) means communication from an AP to a non-AP STA. Uplink (UL) means communication from a non-AP STA to an AP. In DL, a transmitter may be part of an AP, and a receiver may be part of a non-AP STA. In UL, a transmitter may be part of a non-AP STA, and a receiver may be part of an AP.

FIG. 2 is a diagram illustrating the configuration of layer architecture of an IEEE 802.11 system to which an embodiment of the present invention may be applied.

Referring to FIG. 2, the layer architecture of the IEEE 802.11 system may include an MAC sublayer and a PHY sublayer.

The PHY sublayer may be divided into a physical layer convergence procedure (PLCP) entity and a physical medium dependent (PMD) entity. In this case, the PLCP entity functions to connect the MAC sublayer and a data frame, and the PMD entity functions to wirelessly transmit and receive data to and from two or more STAs.

The MAC sublayer and the PHY sublayer may include respective management entities, which may be referred to as an MAC sublayer management entity (MLME) and a PHY sublayer management entity (PLME), respectively. The management entities provide a layer management service interface through the operation of a layer management function. The MLME is connected to the PLME and may perform the management operation of the MAC sublayer. Likewise, the PLME is also connected to the MLME and may perform the management operation of the PHY sublayer.

In order to provide a precise MAC operation, a station management entity (SME) may be present in each STA. The SME is a management entity independent of each layer, and collects layer-based state information from the MLME and the PLME or sets the values of layer-specific parameters. The SME may perform such a function instead of common system management entities and may implement a standard management protocol.

The MLME, the PLME, and the SME may interact with each other using various methods based on primitives. More specifically, an XX-GET.request primitive is used to request the value of a management information base (MIB) attribute. An XX-GET.confirm primitive returns the value of a corresponding MIB attribute if the state is "SUCCESS", and indicates an error in the state field and returns the value in other cases. An XX-SET.request primitive is used to make a request so that a designated MIB attribute is set as a given value. If an MIB attribute means a specific operation, such a request requests the execution of the specific operation. Furthermore, an XX-SET.confirm primitive means that a designated MIB attribute has been set as a requested value if the state is "SUCCESS." In other cases, the XX-SET.confirm primitive indicates that the state field is an error situation. If an MIB attribute means a specific operation, the primitive may confirm that a corresponding operation has been performed.

An operation in each sublayer is described in brief as follows.

The MAC sublayer generates one or more MAC protocol data units (MPDUs) by attaching an MAC header and a frame check sequence (FCS) to a MAC service data unit (MSDU) received from a higher layer (e.g., an LLC layer) or the fragment of the MSDU. The generated MPDU is delivered to the PHY sublayer.

If an aggregated MSDU (A-MSDU) scheme is used, a plurality of MSDUs may be aggregated into a single aggregated MSDU (A-MSDU). The MSDU aggregation operation may be performed in an MAC higher layer. The A-MSDU is delivered to the PHY sublayer as a single MPDU (if it is not fragmented).

The PHY sublayer generates a physical protocol data unit (PPDU) by attaching an additional field, including information for a PHY transceiver, to a physical service data unit (PSDU) received from the MAC sublayer. The PPDU is transmitted through a wireless medium.

The PSDU has been received by the PHY sublayer from the MAC sublayer, and the MPDU has been transmitted from the MAC sublayer to the PHY sublayer. Accordingly, the PSDU is substantially the same as the MPDU.

If an aggregated MPDU (A-MPDU) scheme is used, a plurality of MPDUs (in this case, each MPDU may carry an A-MSDU) may be aggregated in a single A-MPDU. The MPDU aggregation operation may be performed in an MAC lower layer. The A-MPDU may include an aggregation of various types of MPDUs (e.g., QoS data, acknowledge (ACK), and a block ACK (BlockAck)). The PHY sublayer receives an A-MPDU, that is, a single PSDU, from the MAC sublayer. That is, the PSDU includes a plurality of MPDUs.

Accordingly, the A-MPDU is transmitted through a wireless medium within a single PPDU.

Physical Protocol Data Unit (PPDU) Format

A PPDU means a data block generated in the physical layer. A PPDU format is described below based on an IEEE 802.11 a WLAN system to which an embodiment of the present invention may be applied.

FIG. 3 illustrating a non-HT format PPDU and an HT format PPDU in a wireless communication system to which an embodiment of the present invention may be applied.

FIG. 3(a) illustrates a non-HT format PPDU for supporting IEEE 802.11a/g systems. The non-HT PPDU may also be called a legacy PPDU.

Referring to FIG. 3(a), the non-HT format PPDU is configured to include a legacy format preamble, including a legacy (or non-HT) short training field (L-STF), a legacy (or non-HT) long training field (L-LTF), and a legacy (or non-HT) signal (L-SIG) field, and a data field.

The L-STF may include a short training orthogonal frequency division multiplexing symbol (OFDM). The L-STF may be used for frame timing acquisition, automatic gain control (AGC), diversity detection, and coarse frequency/time synchronization.

The L-LTF may include a long training OFDM symbol. The L-LTF may be used for fine frequency/time synchronization and channel estimation.

The L-SIG field may be used to send control information for the demodulation and decoding of the data field.

The L-SIG field may include a rate field of four bits, a reserved field of 1 bit, a length field of 12 bits, a parity bit of 1 bit, and a signal tail field of 6 bits.

The rate field includes transfer rate information, and the length field indicates the number of octets of a PSDU.

FIG. 3(b) illustrates an HT mixed format PPDU for supporting both an IEEE 802.11n system and IEEE 802.11a/g system.

Referring to FIG. 3(b), the HT mixed format PPDU is configured to include a legacy format preamble including an L-STF, an L-LTF, and an L-SIG field, an HT format preamble including an HT-signal (HT-SIG) field, a HT short training field (HT-STF), and a HT long training field (HT-LTF), and a data field.

The L-STF, the L-LTF, and the L-SIG field mean legacy fields for backward compatibility and are the same as those of the non-HT format from the L-STF to the L-SIG field. An L-STA may interpret a data field through an L-LTF, an L-LTF, and an L-SIG field although it receives an HT mixed PPDU. In this case, the L-LTF may further include information for channel estimation to be performed by an HT-STA in order to receive the HT mixed PPDU and to demodulate the L-SIG field and the HT-SIG field.

An HT-STA may be aware of an HT mixed format PPDU using the HT-SIG field subsequent to the legacy fields, and may decode the data field based on the HT mixed format PPDU.

The HT-LTF may be used for channel estimation for the demodulation of the data field. IEEE 802.11n supports single user multi-input and multi-output (SU-MIMO) and thus may include a plurality of HT-LTFs for channel estimation with respect to each of data fields transmitted in a plurality of spatial streams.

The HT-LTF may include a data HT-LTF used for channel estimation for a spatial stream and an extension HT-LTF additionally used for full channel sounding. Accordingly, a plurality of HT-LTFs may be the same as or greater than the number of transmitted spatial streams.

In the HT mixed format PPDU, the L-STF, the L-LTF, and the L-SIG fields are first transmitted so that an L-STA can receive the L-STF, the L-LTF, and the L-SIG fields and obtain data. Thereafter, the HT-SIG field is transmitted for the demodulation and decoding of data transmitted for an HT-STA.

An L-STF, an L-LTF, L-SIG, and HT-SIG fields are transmitted without performing beamforming up to an HT-SIG field so that an L-STA and an HT-STA can receive a corresponding PPDU and obtain data. In an HT-STF, an HT-LTF, and a data field that are subsequently transmitted, radio signals are transmitted through precoding. In this case, an HT-STF is transmitted so that an STA receiving a corresponding PPDU by performing precoding may take into considerate a portion whose power is varied by precoding, and a plurality of HT-LTFs and a data field are subsequently transmitted.

FIG. 3(c) illustrates an HT-green field format PPDU (HT-GF format PPDU) for supporting only an IEEE 802.11n system.

Referring to FIG. 3(c), the HT-GF format PPDU includes an HT-GF-STF, an HT-LTF1, an HT-SIG field, a plurality of HT-LTF2s, and a data field.

The HT-GF-STF is used for frame timing acquisition and AGC.

The HT-LTF1 is used for channel estimation.

The HT-SIG field is used for the demodulation and decoding of the data field.

The HT-LTF2 is used for channel estimation for the demodulation of the data field. Likewise, an HT-STA uses SU-MIMO. Accordingly, a plurality of the HT-LTF2s may be configured because channel estimation is necessary for each of data fields transmitted in a plurality of spatial streams.

The plurality of HT-LTF2s may include a plurality of data HT-LTFs and a plurality of extension HT-LTFs like the HT-LTF of the HT mixed PPDU.

In FIGS. 3(a) to 3(c), the data field is a payload and may include a service field, a scrambled PSDU (PSDU) field, tail bits, and padding bits. All of the bits of the data field are scrambled.

FIG. 3(d) illustrates a service field included in the data field. The service field has 20 bits. The 16 bits are assigned No. 0 to No. 15 and are sequentially transmitted from the No. 0 bit. The No. 0 bit to the No. 6 bit are set to 0 and are used to synchronize a descrambler within a reception stage.

An IEEE 802.11ac WLAN system supports the transmission of a DL multi-user multiple input multiple output (MU-MIMO) method in which a plurality of STAs accesses a channel at the same time in order to efficiently use a radio channel. In accordance with the MU-MIMO transmission method, an AP may simultaneously transmit a packet to one or more STAs that have been subjected to MIMO pairing.

Downlink multi-user transmission (DL MU transmission) means a technology in which an AP transmits a PPDU to a plurality of non-AP STAs through the same time resources using one or more antennas.

Hereinafter, an MU PPDU means a PPDU which delivers one or more PSDUs for one or more STAs using the MU-MIMO technology or the OFDMA technology. Furthermore, an SU PPDU means a PPDU having a format in which only one PSDU can be delivered or which does not have a PSDU.

For MU-MIMO transmission, the size of control information transmitted to an STA may be relatively larger than the size of 802.11n control information. Control information additionally required to support MU-MIMO may include information indicating the number of spatial streams received by each STA and information related to the modulation and coding of data transmitted to each STA may correspond to the control information, for example.

Accordingly, when MU-MIMO transmission is performed to provide a plurality of STAs with a data service at the same time, the size of transmitted control information may be increased according to the number of STAs which receive the control information.

In order to efficiently transmit the control information whose size is increased as described above, a plurality of pieces of control information required for MU-MIMO transmission may be divided into two types of control information: common control information that is required for all of STAs in common and dedicated control information individually required for a specific STA, and may be transmitted.

FIG. 4 illustrates a VHT format PPDU in a wireless communication system to which an embodiment of the present invention may be applied.

FIG. 4(a) illustrates a VHT format PPDU for supporting an IEEE 802.11ac system.

Referring to FIG. 4(a), the VHT format PPDU is configured to include a legacy format preamble including an L-STF, an L-LTF, and an L-SIG field, a VHT format preamble including a VHT-signal-A (VHT-SIG-A) field, a VHT short training field (VHT-STF), a VHT long training field (VHT-LTF), and a VHT-signal-B (VHT-SIG-B) field, and a data field.

The L-STF, the L-LTF, and the L-SIG field mean legacy fields for backward compatibility and have the same formats as those of the non-HT format. In this case, the L-LTF may further include information for channel estimation which will be performed in order to demodulate the L-SIG field and the VHT-SIG-A field.

The L-STF, the L-LTF, the L-SIG field, and the VHT-SIG-A field may be repeated in a 20 MHz channel unit and transmitted. For example, when a PPDU is transmitted through four 20 MHz channels (i.e., an 80 MHz bandwidth), the L-STF, the L-LTF, the L-SIG field, and the VHT-SIG-A field may be repeated every 20 MHz channel and transmitted.

A VHT-STA may be aware of the VHT format PPDU using the VHT-SIG-A field subsequent to the legacy fields, and may decode the data field based on the VHT-SIG-A field.

In the VHT format PPDU, the L-STF, the L-LTF, and the L-SIG field are first transmitted so that even an L-STA can receive the VHT format PPDU and obtain data. Thereafter, the VHT-SIG-A field is transmitted for the demodulation and decoding of data transmitted for a VHT-STA.

The VHT-SIG-A field is a field for the transmission of control information that is common to a VHT STAs that are MIMO-paired with an AP, and includes control information for interpreting the received VHT format PPDU.

The VHT-SIG-A field may include a VHT-SIG-A1 field and a VHT-SIG-A2 field.

The VHT-SIG-A1 field may include information about a channel bandwidth (BW) used, information about whether space time block coding (STBC) is applied or not, a group identifier (ID) for indicating a group of grouped STAs in MU-MIMO, information about the number of streams used (the number of space-time streams (NSTS)/part association identifier (AID), and transmit power save forbidden information. In this case, the group ID means an identifier assigned to a target transmission STA group in order to support MU-MIMO transmission, and may indicate whether the present MIMO transmission method is MU-MIMO or SU-MIMO.

The VHT-SIG-A2 field may include information about whether a short guard interval (GI) is used or not, forward error correction (FEC) information, information about a modulation and coding scheme (MCS) for a single user, information about the type of channel coding for multiple users, beamforming-related information, redundancy bits for cyclic redundancy checking (CRC), the tail bits of a convolutional decoder and so on.

The VHT-STF is used to improve AGC estimation performance in MIMO transmission.

The VHT-LTF is used for a VHT-STA to estimate an MIMO channel. Since a VHT WLAN system supports MU-MIMO, the VHT-LTF may be configured by the number of spatial streams through which a PPDU is transmitted. Additionally, if full channel sounding is supported, the number of VHT-LTFs may be increased.

The VHT-SIG-B field includes dedicated control information which is necessary for a plurality of MU-MIMOpaired VHT-STAs to receive a PPDU and to obtain data. Accordingly, only when common control information included in the VHT-SIG-A field indicates that a received PPDU is for MU-MIMO transmission, a VHT-STA may be designed to decode the VHT-SIG-B field. In contrast, if common control information indicates that a received PPDU is for a single VHT-STA (including SU-MIMO), an STA may be designed to not decode the VHT-SIG-B field.

The VHT-SIG-B field includes a VHT-SIG-B length field, a VHT-MCS field, a reserved field, and a tail field.

The VHT-SIG-B length field indicates the length of an A-MPDU (prior to end-of-frame (EOF) padding). The VHT-MCS field includes information about the modulation, encoding, and rate-matching of each VHT-STA.

The size of the VHT-SIG-B field may be different depending on the type (MU-MIMO or SU-MIMO) of MIMO transmission and a channel bandwidth used for PPDU transmission.

FIG. 4(b) illustrates a VHT-SIG-B field according to a PPDU transmission bandwidth.

Referring to FIG. 4(b), in 40 MHz transmission, VHT-SIG-B bits are repeated twice. In 80 MHz transmission, VHT-SIG-B bits are repeated four times, and padding bits set to 0 are attached.

In 160 MHz transmission and 80+80 MHz transmission, first, VHT-SIG-B bits are repeated four times as in the 80 MHz transmission, and padding bits set to 0 are attached. Furthermore, a total of the 117 bits is repeated again.

In a system supporting MU-MIMO, in order to transmit PPDUs having the same size to STAs paired with an AP, information indicating the size of the bits of a data field forming the PPDU and/or information indicating the size of bit streams forming a specific field may be included in the VHT-SIG-A field.

In this case, an L-SIG field may be used to effectively use a PPDU format. A length field and a rate field which are included in the L-SIG field and transmitted so that PPDUs having the same size are transmitted to all of STAs may be used to provide required information. In this case, additional padding may be required in the physical layer because an MAC protocol data unit (MPDU) and/or an aggregate MAC PDU (A-MPDU) are set based on the bytes (or octets) of the MAC layer.

In FIG. 4, the data field is a payload and may include a service field, a scrambled PSDU, tail bits, and padding bits.

An STA needs to determine the format of a received PPDU because several formats of PPDUs are mixed and used as described above.

In this case, the meaning that a PPDU (or a PPDU format) is determined may be various. For example, the meaning that a PPDU is determined may include determining whether a received PPDU is a PPDU capable of being decoded (or interpreted) by an STA. Furthermore, the meaning that a PPDU is determined may include determining whether a received PPDU is a PPDU capable of being supported by an STA. Furthermore, the meaning that a PPDU is determined may include determining that information transmitted through a received PPDU is which information.

MAC Frame Format

FIG. 5 illustrates the format of an MAC frame for an IEEE 802.11 system to which an embodiment of the present invention may be applied.

Referring to FIG. 5, the MAC frame (i.e., an MPDU) includes an MAC header, a frame body, and a frame check sequence (FCS).

The MAC Header is defined as an area, including a frame control field, a duration/ID field, an address 1 field, an address 2 field, an address 3 field, a sequence control field, an address 4 field, a QoS control field, and an HT control field.

The frame control field includes information about the characteristics of a corresponding MAC frame.

The duration/ID field may be implemented to have a different value depending on the type and subtype of a corresponding MAC frame.

If the type and subtype of a corresponding MAC frame is a PS-poll frame for a power save (PS) operation, the duration/ID field may be configured to include the association identifier (AID) of an STA that has transmitted the frame. In the remaining cases, the duration/ID field may be configured to have a specific duration value depending on the type and subtype of a corresponding MAC frame. Furthermore, if a frame is an MPDU included in an aggregate-MPDU (A-MPDU) format, the duration/ID field included in an MAC header may be configured to have the same value.

The address 1 field to the address 4 field are used to indicate a BSSID, a source address (SA), a destination address (DA), a transmitting address (TA) indicating the address of a transmitting STA, and a receiving address (RA) indicating the address of a receiving STA.

An address field implemented as a TA field may be set as a bandwidth signaling TA value. In this case, the TA field may indicate that a corresponding MAC frame includes additional information in a scrambling sequence. The bandwidth signaling TA may be represented as the MAC address of an STA that sends a corresponding MAC frame, but individual/group bits included in the MAC address may be set as a specific value (e.g., "1").

The sequence control field is configured to include a sequence number and a fragment number. The sequence number may indicate a sequence number assigned to a corresponding MAC frame. The fragment number may indicate the number of each fragment of a corresponding MAC frame.

The QoS control field includes information related to QoS. The QoS control field may be included if it indicates a QoS data frame in a subtype subfield.

The HT control field includes control information related to an HT and/or VHT transmission/reception scheme. The HT control field is included in a control wrapper frame. Furthermore, the HT control field is present in a QoS data frame having an order subfield value of 1 and a management frame.

The frame body is defined as an MAC payload. Data to be transmitted in a higher layer is placed in the frame body. The frame body has a varying size. For example, a maximum size of an MPDU may be 11454 octets, and a maximum size of a PPDU may be 5.484 ms.

The FCS is defined as a MAC footer and used for the error search of an MAC frame.

The first three fields (i.e., the frame control field, the duration/ID field, and Address 1 field) and the last field (i.e., the FCS field) form a minimum frame format and are present in all of frames. The remaining fields may be present only in a specific frame type.

FIG. 6 is a diagram illustrating a frame control field within an MAC frame in a wireless communication system to which an embodiment of the present invention may be applied.

Referring to FIG. 6, the frame control field includes a Protocol Version subfield, a Type subfield, a Subtype subfield, a To DS subfield, a From DS subfield, a More Fragments subfield, a Retry subfield, a Power Management subfield, a More Data subfield, a Protected Frame subfield, and an Order subfield.

The Protocol Version subfield may indicate the version of a WLAN protocol applied to a corresponding MAC frame.

The Type subfield and the Subtype subfield may be set to indicate information that identifies the function of a corresponding MAC frame.

The type of MAC frame may include the three types of management frames, control frames, and data frames.

Furthermore, each of the frame types may be divided into subtypes.

For example, the control frames may include request to send (RTS) frame, a clear-to-send (CTS) frame, an acknowledgment (ACK) frame, a PS-poll frame, a contention free (CF)-end frame, a CF-End+CF-ACK frame, a block ACK request (BAR) frame, a block ACK (BA) frame, a control wrapper (Control+HTcontrol)) frame, a VHT null data packet announcement (NDPA), and a beamforming report poll frame.

The management frames may include a beacon frame, an announcement traffic indication message (ATIM) frame, a disassociation frame, an association request/response frame, a reassociation request/response frame, a probe request/response frame, an authentication frame, a deauthentication frame, an action frame, an action no ACK frame, and a timing advertisement frame.

The To DS subfield and the From DS subfield may include information that is necessary to analyze an Address 1 field to an Address 4 field included in a corresponding MAC frame header. In the case of the control frame, both the To DS subfield and the From DS subfield are set to "0." In the case of the management frame, the To DS subfield and the From DS subfield may be sequentially set to "1" and "0" if a corresponding frame is a QoS management frame (QMF) and may be sequentially set to "0" and "0" if a corresponding frame is not a QMF.

The More Fragments subfield may indicate whether a fragment to be transmitted after a corresponding MAC frame is present or not. The More Fragments subfield may be set to "1" if another fragment of a current MSDU or MMPDU is present and may be set to "0" if another fragment of a current MSDU or MMPDU is not present.

The Retry subfield may indicate whether the transmission of a corresponding MAC frame is based on the retransmission of a previous MAC frame. The Retry subfield may be set to "1" if the transmission of a corresponding MAC frame is based on the retransmission of a previous MAC frame and may be set to "0" if the transmission of a corresponding MAC frame is not based on the retransmission of a previous MAC frame.

The Power Management subfield may indicate power management mode of an STA. The Power Management subfield may indicate that an STA switches to power saving mode if the Power Management subfield value is "1."

The More Data subfield may indicate whether an MAC frame to be additionally transmitted is present or not. The More Data subfield may be set to "1" if an MAC frame to be additionally transmitted is present and may be set to "0" if an MAC frame to be additionally transmitted is not present.

The Protected Frame subfield may indicate whether a Frame Body field has been encrypted. The Protected Frame subfield may be set to "1" if the Frame Body field includes information processed by a cryptographic encapsulation algorithm and may be set to "0" if the Frame Body field does not include information processed by a cryptographic encapsulation algorithm.

The pieces of information included in each of the aforementioned fields may comply with the definition of the IEEE 802.11 system. Furthermore, the aforementioned fields correspond to an example of fields which may be included in an MAC frame, but the present invention is not limited thereto. That is, each of the aforementioned fields may be replaced with another field or an additional field may be further included and all of the fields may not be essentially included.

FIG. 7 illustrates the VHT format of an HT control field in a wireless communication system to which an embodiment of the present invention may be applied.

Referring to FIG. 7, the HT control field may include a VHT subfield, an HT control middle subfield, an AC constraint subfield, and a reverse direction grant (RDG)/more PPDU subfield.

The VHT subfield indicates whether the HT control field has the format of an HT control field for VHT (VHT=1) or has the format of an HT control field for HT (VHT=0). In FIG. 9, it is assumed that the HT control field is an HT control field for VHT (i.e., VHT=1). The HT control field for VHT may be called a VHT control field.

The HT control middle subfield may be implemented to a different format depending on the indication of a VHT subfield. The HT control middle subfield is described in detail later.

The AC constraint subfield indicates whether the mapped access category (AC) of a reverse direction (RD) data frame is constrained to a single AC.

The RDG/more PPDU subfield may be differently interpreted depending on whether a corresponding field is transmitted by an RD initiator or an RD responder.

Assuming that a corresponding field is transmitted by an RD initiator, the RDG/more PPDU subfield is set as "1" if an RDG is present, and the RDG/more PPDU subfield is set as "0" if an RDG is not present. Assuming that a corresponding field is transmitted by an RD responder, the RDG/more PPDU subfield is set as "1" if a PPDU including the corresponding subfield is the last frame transmitted by the RD responder, and the RDG/more PPDU subfield is set as "0" if another PPDU is transmitted. As described above, the HT control middle subfield may be implemented to a different format depending on the indication of a VHT subfield.

The HT control middle subfield of an HT control field for VHT may include a reserved bit subfield, a modulation and coding scheme (MCS) feedback request (MRQ) subfield, an MRQ sequence identifier (MSI)/space-time block coding (STBC) subfield, an MCS feedback sequence identifier (MFSI)/least significant bit (LSB) of group ID (GID-L) subfield, an MCS feedback (MFB) subfield, a most significant Bit (MSB) of group ID (GID-H) subfield, a coding type subfield, a feedback transmission type (FB Tx type) subfield, and an unsolicited MFB subfield.

Furthermore, the MFB subfield may include the number of VHT space time streams (NUM_STS) subfield, a VHT-MCS subfield, a bandwidth (BW) subfield, and a signal to noise ratio (SNR) subfield.

The NUM_STS subfield indicates the number of recommended spatial streams. The VHT-MCS subfield indicates a recommended MCS. The BW subfield indicates bandwidth information related to a recommended MCS. The SNR subfield indicates an average SNR value of data subcarriers and spatial streams.

The information included in each of the aforementioned fields may comply with the definition of an IEEE 802.11 system. Furthermore, each of the aforementioned fields corresponds to an example of fields which may be included in an MAC frame and is not limited thereto. That is, each of the aforementioned fields may be substituted with another field, additional fields may be further included, and all of the fields may not be essentially included.

Medium Access Mechanism

In IEEE 802.11, communication is basically different from that of a wired channel environment because it is performed in a shared wireless medium.

In a wired channel environment, communication is possible based on carrier sense multiple access/collision detection (CSMA/CD). For example, when a signal is once transmitted by a transmission stage, it is transmitted up to a reception stage without experiencing great signal attenuation because there is no great change in a channel environment. In this case, when a collision between two or more signals is detected, detection is possible. The reason for this is that power detected by the reception stage becomes instantly higher than power transmitted by the transmission stage. In a radio channel environment, however, since various factors (e.g., signal attenuation is great depending on the distance or instant deep fading may be generated) affect a channel, a transmission stage is unable to accurately perform carrier sensing regarding whether a signal has been correctly transmitted by a reception stage or a collision has been generated.

Accordingly, in a WLAN system according to IEEE 802.11, a carrier sense multiple access with collision avoidance (CSMA/CA) mechanism has been introduced as the basic access mechanism of MAC. The CAMA/CA mechanism is also called a distributed coordination function (DCF) of IEEE 802.11 MAC, and basically adopts a "listen before talk" access mechanism. In accordance with such a type of access mechanism, an AP and/or an STA perform clear channel assessment (CCA) for sensing a radio channel or a medium for a specific time interval (e.g., a DCF inter-frame space (DIFS)) prior to transmission. If, as a result of the sensing, the medium is determined to be an idle state, the AP and/or the STA starts to transmit a frame through the corresponding medium. In contrast, if, as a result of the sensing, the medium is determined to be a busy state (or an occupied status), the AP and/or the STA do not start their transmission, may wait for a delay time (e.g., a random backoff period) for medium access in addition to the DIFS assuming that several STAs already wait for in order to use the corresponding medium, and may then attempt frame transmission.

Assuming that several STAs trying to transmit frames are present, they will wait for different times because the STAs stochastically have different backoff period values and will attempt frame transmission. In this case, a collision can be minimized by applying the random backoff period.

Furthermore, the IEEE 802.11 MAC protocol provides a hybrid coordination function (HCF). The HCF is based on a DCF and a point coordination function (PCF). The PCF is a polling-based synchronous access method, and refers to a method for periodically performing polling so that all of receiving APs and/or STAs can receive a data frame. Furthermore, the HCF has enhanced distributed channel access (EDCA) and HCF controlled channel access (HCCA). In EDCA, a provider performs an access method for providing a data frame to multiple users on a contention basis. In HCCA, a non-contention-based channel access method using a polling mechanism is used. Furthermore, the HCF includes a medium access mechanism for improving the quality of service (QoS) of a WLAN, and may transmit QoS data in both a contention period (CP) and a contention-free period (CFP).

FIG. 8 is a diagram illustrating a random backoff period and a frame transmission procedure in a wireless communication system to which an embodiment of the present invention may be applied.

When a specific medium switches from an occupied (or busy) state to an idle state, several STAs may attempt to transmit data (or frames). In this case, as a scheme for minimizing a collision, each of the STAs may select a random backoff count, may wait for a slot time corresponding to the selected random backoff count, and may attempt transmission. The random backoff count has a pseudo-random integer value and may be determined as one of uniformly distributed values in 0 to a contention window (CW) range. In this case, the CW is a CW parameter value. In the CW parameter, CW_min is given as an initial value. If transmission fails (e.g., if ACK for a transmitted frame is not received), the CW_min may have a twice value. If the CW parameter becomes CW_max, it may maintain the CW_max value until data transmission is successful, and the data transmission may be attempted. If the data transmission is successful, the CW parameter is reset to a CW_min value. The CW, CW_min, and CW_max values may be set to $2^n-1$ (n=0, 1, 2, . . . ,).

When a random backoff process starts, an STA counts down a backoff slot based on a determined backoff count value and continues to monitor a medium during the countdown. When the medium is monitored as a busy state, the STA stops the countdown and waits. When the medium becomes an idle state, the STA resumes the countdown.

In the example of FIG. 8, when a packet to be transmitted in the MAC of an STA 3 is reached, the STA 3 may check that a medium is an idle state by a DIFS and may immediately transmit a frame.

The remaining STAs monitor that the medium is the busy state and wait. In the meantime, data to be transmitted by each of an STA 1, an STA 2, and an STA 5 may be generated. When the medium is monitored as an idle state, each of the STAs waits for a DIFS and counts down a backoff slot based on each selected random backoff count value.

The example of FIG. 8 shows that the STA 2 has selected the smallest backoff count value and the STA 1 has selected the greatest backoff count value. That is, FIG. 8 illustrates that the remaining backoff time of the STA 5 is shorter than the remaining backoff time of the STA 1 at a point of time at which the STA 2 finishes a backoff count and starts frame transmission.

The STA 1 and the STA 5 stop countdown and wait while the STA 2 occupies the medium. When the occupation of the medium by the STA is finished and the medium becomes an idle state again, each of the STA 1 and the STA 5 waits for a DIFS and resumes the stopped backoff count. That is, each of the STA 1 and the STA 5 may start frame transmission after counting down the remaining backoff slot corresponding to the remaining backoff time. The STA 5 starts frame transmission because the STA 5 has a shorter remaining backoff time than the STA 1.

While the STA 2 occupies the medium, data to be transmitted by an STA 4 may be generated. In this case, from a standpoint of the STA 4, when the medium becomes an idle state, the STA 4 waits for a DIFS and counts down a backoff slot corresponding to its selected random backoff count value.

FIG. 8 shows an example in which the remaining backoff time of the STA 5 coincides with the random backoff count value of the STA 4. In this case, a collision may be generated between the STA 4 and the STA 5. When a collision is generated, both the STA 4 and the STA 5 do not receive ACK, so data transmission fails. In this case, each of the STA 4 and the STA 5 doubles its CW value, select a random backoff count value, and counts down a backoff slot.

The STA 1 waits while the medium is the busy state due to the transmission of the STA 4 and the STA 5. When the medium becomes an idle state, the STA 1 may wait for a DIFS and start frame transmission after the remaining backoff time elapses.

The CSMA/CA mechanism includes virtual carrier sensing in addition to physical carrier sensing in which an AP and/or an STA directly sense a medium.

Virtual carrier sensing is for supplementing a problem which may be generated in terms of medium access, such as a hidden node problem. For the virtual carrier sensing, the MAC of a WLAN system uses a network allocation vector (NAV). The NAV is a value indicated by an AP and/or an STA which now uses a medium or has the right to use the medium in order to notify another AP and/or STA of the remaining time until the medium becomes an available state. Accordingly, a value set as the NAV corresponds to the period in which a medium is reserved to be used by an AP and/or an STA that transmit corresponding frames. An STA that receives an NAV value is prohibited from accessing the medium during the corresponding period. The NAV may be set based on the value of the duration field of the MAC header of a frame, for example.

An APand/or an STA may perform a procedure for exchanging a request to send (RTS) frame and a clear to send (CTS) frame in order to provide notification that they will access a medium. The RTS frame and the CTS frame include information indicating a temporal section in which a wireless medium required to transmit/receive an ACK frame has been reserved to be accessed if substantial data frame transmission and an acknowledgement response (ACK) are supported. Another STA which has received an RTS frame from an AP and/or an STA attempting to send a frame or which has received a CTS frame transmitted by an STA to which a frame will be transmitted may be configured to not access a medium during a temporal section indicated by information included in the RTS/CTS frame. This may be implemented by setting the NAV during a time interval.

Interframe Space (IFS)

A time interval between frames is defined as an interframe space (IFS). An STA may determine whether a channel is used during an IFS time interval through carrier sensing (including physical carrier and virtual carrier sensing). In an 802.11 WLAN system, a plurality of IFSs is defined in order to provide a priority level by which a wireless medium is occupied.

FIG. 9 is a diagram illustrating an IFS relation in a wireless communication system to which an embodiment of the present invention may be applied.

All of pieces of timing may be determined with reference to physical layer interface primitives, that is, a PHY-TX-END.confirm primitive, a PHYTXSTART.confirm primitive, a PHY-RXSTART.indication primitive, and a PHY-RXEND.indication primitive.

An interframe space (IFS) depending on an IFS type is as follows.

a) A reduced interframe space (IFS) (RIFS)
b) A short interframe space (IFS) (SIFS)
c) A PCF interframe space (IFS) (PIFS)
d) A DCF interframe space (IFS) (DIFS)
e) An arbitration interframe space (IFS) (AIFS)
f) An extended interframe space (IFS) (EIFS)

Different IFSs are determined based on attributes specified by a physical layer regardless of the bit rate of an STA. IFS timing is defined as a time gap on a medium. IFS timing other than an AIFS is fixed for each physical layer.

The SIFS is used to transmits a PPDU including an ACK frame, a CTS frame, a block ACK request (BlockAckReq) frame, or a block ACK (BlockAck) frame, that is, an instant response to an A-MPDU, the second or consecutive MPDU of a fragment burst, and a response from an STA with respect to polling according to a PCF. The SIFS has the highest priority. Furthermore, the SIFS may be used for the point coordinator of frames regardless of the type of frame during a non-contention period (CFP) time. The SIFS indicates the time prior to the start of the first symbol of the preamble of a next frame which is subsequent to the end of the last symbol of a previous frame or from signal extension (if present).

SIFS timing is achieved when the transmission of consecutive frames is started in a Tx SIFS slot boundary.

The SIFS is the shortest in IFS between transmissions from different STAs. The SIFS may be used if an STA occupying a medium needs to maintain the occupation of the medium during the period in which the frame exchange sequence is performed.

Other STAs required to wait so that a medium becomes an idle state for a longer gap can be prevented from attempting to use the medium because the smallest gap between transmissions within a frame exchange sequence is used. Accordingly, priority may be assigned in completing a frame exchange sequence that is in progress.

The PIFS is used to obtain priority in accessing a medium.
The PIFS may be used in the following cases.
An STA operating under a PCF
An STA sending a channel switch announcement frame
An STA sending a traffic indication map (TIM) frame
A hybrid coordinator (HC) starting a CFP or transmission opportunity (TXOP)
An HC or non-AP QoS STA, that is, a TXOP holder polled for recovering from the absence of expected reception within a controlled access phase (CAP)
An HT STA using dual CTS protection before sending CTS2
A TXOP holder for continuous transmission after a transmission failure
A reverse direction (RD) initiator for continuous transmission using error recovery
An HT AP during a PSMP sequence in which a power save multi-poll (PSMP) recovery frame is transmitted
An HT AT performing CCA within a secondary channel before sending a 40 MHz mask PPDU using EDCA channel access In the illustrated examples, an STA using the PIFS starts transmission after a carrier sense (CS) mechanism for determining that a medium is an idle state in a Tx PIFS slot boundary other than the case where CCA is performed in a secondary channel.

The DIFS may be used by an STA which operates to send a data frame (MPDU) and a MAC management protocol data unit management (MMPDU) frame under the DCF. An STA using the DCF may transmit data in a TxDIFS slot boundary if a medium is determined to be an idle state through a carrier sense (CS) mechanism after an accurately received frame and a backoff time expire. In this case, the accurately received frame means a frame indicating that the PHY-RXEND.indication primitive does not indicate an error and an FCS indicates that the frame is not an error (i.e., error free).

An SIFS time ("aSIFSTime") and a slot time ("aSlot-Time") may be determined for each physical layer. The SIFS time has a fixed value, but the slot time may be dynamically changed depending on a change in the wireless delay time "aAirPropagationTime."

Block ACK Procedure

FIG. 10 is a diagram illustrating a downlink MU-MIMO transmission process in a wireless communication system to which an embodiment of the present invention may be applied.

In 802.11ac, MU-MIMO is defined in downlink from an AP to a client (i.e., a non-AP STA). In this case, a multi-user frame is transmitted to multiple recipients at the same time, but acknowledgement (ACK) needs to be individually transmitted in uplink.

All of MPDUs transmitted within a VHT MU PPDU based on 802.11ac are included in an A-MPDU. Accordingly, a response to the A-MPDU within the VHT MU PPDU other than an immediate response to the VHT MU PPDU is transmitted in response to a block ACK request (BAR) frame by the AP.

First, the AP sends the VHT MU PPDU (i.e., a preamble and data) to all of recipients (i.e., an STA 1, an STA 2, and an STA 3). The VHT MU PPDU includes a VHT A-MPDU transmitted to each STA.

The STA 1 that has received the VHT MU PPDU from the AP sends a block acknowledgement (BA) frame to the AP after an SIFS. The BA frame is described later in detail.

The AP that has received the BA from the STA 1 sends a block acknowledgement request (BAR) frame to the STA 2 after an SIFS. The STA 2 sends a BA frame to the AP after an SIFS. The AP that has received the BA frame from the STA 2 sends a BAR frame to the STA 3 after an SIFS. The STA 3 sends a BA frame to the AP after an SIFS.

When such a process is performed by all of the STAs, the AP sends a next MU PPDU to all of the STAs.

High Efficiency (HE, 802.11ax) System

A next-generation WLAN system is described below. The next-generation WLAN system is a next-generation WIFI system. By way of example, IEEE 802.11ax may be described as an embodiment of the next-generation WIFI system. In this specification, the following next-generation WLAN system is named a high efficiency (HE) system, and the frame, PPDU, etc. of the system may be referred to as an HE frame, HE PPDU, HE preamble, HE-SIG field, HE-STF, HE-LTF and so on.

The aforementioned description of an existing WLAN system, such as an VHT system, may be applied to contents that have not been additionally described with respect to the HE system. For example, the aforementioned description of the VHT-SIG A field, the VHT-STF, the VHT-LTF, and the VHT-SIG-B field may be applied to the HE-SIG A field, the HE-STF, the HE-LTF, and the HE-SIG-B field. The HE frame, preamble, etc. of the proposed HE system may also be used in other wireless communication or cellular systems. As described above, an HE STA may be a non-AP STA or AP STA. In this specification, although an STA is described, such an STA device may also denote an HE STA device.

An HE format PPDU for HEW may basically include a legacy part (L-part), an HE-part, and a data field (HE-data).

The L-part includes an L-STF field, an L-LTF field, and an L-SIG field like a form maintained in an existing WLAN system. The L-STF field, the L-LTF field, and the L-SIG field may also be called a legacy preamble.

The HE-part is a part newly defined for the 802.11ax standard, and may include an HE-STF field, an HE-SIG field, and an HE-LTF field. The HE-SIG field in addition to the HE-STF field and the HE-LTF field may also be called an HE-preamble.

Furthermore, the legacy preamble and the HE preamble may be collectively called a physical (PHY) preamble/physical preamble.

The HE-SIG field may include information (e.g., OFDMA, UL MU MIMO, and an improved MCS) for decoding the HE-data field.

The L-part and the HE-part may have different fast Fourier transform (FFT) sizes (i.e., subcarrier spacing) and may use different cyclic prefixes.

A (4×) FFT size four times greater than that of a legacy WLAN system may be used in the 802.11ax system. That is, the L-part may have a 1× symbol structure, and the HE-part (more specifically, the HE-preamble and the HE-data) may have a 4×symbol structure. In this case, FFT of a 1×, 2× or 4×size indicates a relative size for a legacy WLAN system (e.g., IEEE 802.11a, 802.11n, and 802.11ac).

For example, if FFT sizes used in the L-part are 64, 128, 256, and 512 in 20 MHz, 40 MHz, 80 MHz, and 200 MHz, respectively, FFT sizes used in the HE-part may be 256, 512, 1024, and 2048 in 20 MHz, 40 MHz, 80 MHz, and 200 MHz, respectively.

As described above, if an FFT size is increased compared to a legacy WLAN system, subcarrier frequency spacing is reduced. Accordingly, the number of subcarriers per unit frequency is increased, but the length of an OFDM symbol is lengthened.

That is, if a larger FFT size is used, it means that subcarrier spacing is narrowed. Likewise, this means that an inverse discrete Fourier transform (IDFT)/discrete Fourier transform (DFT) period is increased. In this case, the IDFT/DFT period may mean the length of an OFDM symbol other than a guard interval (GI).

Accordingly, if an FFT size four times greater than that of the L-part is used in the HE-part (more specifically, the HE-preamble and the HE-data), the subcarrier spacing of the HE-part becomes ¼ times the subcarrier spacing of the L-part and the IDFT/DFT period of the HE-part becomes four times the IDFT/DFT period of the L-part. For example, if the subcarrier spacing of the L-part is 312.5 kHz (=20 MHz/64, 40 MHz/128, 80 MHz/256 and/or 200 MHz/512), the subcarrier spacing of the HE-part may be 78.125 kHz (=20 MHz/256, 40 MHz/512, 80 MHz/1024 and/or 200 MHz/2048). Furthermore, if the IDFT/DFT period of the L-part is 3.2 μs (=1/312.5 kHz), the IDFT/DFT period of the HE-part may be 12.8 μs (=1/78.125 kHz).

Furthermore, in the 802.11ax system, a resource unit may be allocated for each STA through an OFDMA scheme. In an embodiment, the resource unit may be allocated to an STA in a 26-tone, 52-tone or 106-tone unit with respect to a 20 MHz band, in a 26-tone, 52-tone, 106-tone or 242-tone unit with respect to a 40 MHz band, and in a 26-tone, 52-tone, 106-tone, 242-tone or 484-tone unit with respect to an 80 MHz band. Furthermore, the resource unit may be allocated to an STA in a 26-tone, 52-tone, 106-tone, 242-tone, 484-tone or 996-tone unit with respect to a 160 MHz band.

In this specification, the HE-SIG-A is an HE-SIG1, and thus the HE-SIG-B may be referred to as an HE-SIG2.

FIG. 11 shows an HE PPDU format according to an embodiment of the present invention.

In the embodiment of FIG. 11, an HE-SIG1 is placed behind an L-part (an L-STF, an L-LTF, and an L-SIG) using legacy numerology. As in the L-part, the HE-SIG1 may be duplicated in a 20 MHz unit. An HE-SIG-1 field may include common information (a BW, a GI length, a BSS index, CRC, tails, etc.). 4×FFT is applied to HE-DATA, and thus 1024 FFT may be used.

FIG. 12 shows an HE-PPDU format according to another embodiment of the present invention.

In the embodiment of FIG. 12, an HE-SIG1 may further include user allocation information (e.g., the ID (e.g., PAID or GID) and resource allocation information of an STA and N_sts) in addition to common information. Furthermore, an HE-SIG-A may be transmitted according to the resource allocation of OFDMA. In the case of MU-MIMO, an HE-SIG2 may be distinguished by an STA through SDM. The HE-SIG2 may include additional user allocation information (e.g., an MCS, coding, STBC, and TSBF).

FIG. 13 shows an HE-PPDU format according to another embodiment of the present invention.

In the embodiment of FIG. 13, a HE-SIG1 field and an HE-SIG2 field may be included after a legacy preamble, and an HE-STF and an HE-LTF may be subsequently included. The HE-SIG2 may be transmitted after an HE-SIG1 over a full band using the information (numerology) of the HE-SIG1. The HE-SIG2 may include user allocation information (e.g., the ID (e.g., PAID or GID) and resource allocation information of an STA and N_sts).

The HE-STF and the HE-LTF may be included in a corresponding resource unit band according to user-based resource allocation of an OFDMA scheme as in FIG. 12.

The TXOP protection of an UL MU procedure of the 802.11ax system is described below.

An HE system supports UL MU data transmission. More specifically, in UL MU, resources according to each user may be allocated according to an OFDMA scheme and UL MU transmission may be initiated through a trigger frame. For example, an AP STA may send a trigger frame indicative of resource allocation and scheduling to STAs on which UL MU data transmission is to be performed. The STAs that have received the trigger frame may send uplink data at the same time.

FIG. 14 shows the UL MU data transmission of an HE system according to an embodiment of the present invention.

In FIG. 14, MU STAs, such as the MU STA 1 and MU STA 2 of a BSS, perform UL MU data transmission in response to the trigger frame of an AP. In this case, another STA1 within the BSS may not recognize the presence of an UL MU frame. In this case, another STA1 may send UL data after an EIFS, thereby generating a collision. In 11ax UL MU transmission, an UL MU frame/packet may have a longer length than an existing ACK frame, and thus the influence of the collision may be more severe.

FIG. 15 shows the UL MU data transmission of an HE system according to an embodiment of the present invention.

In FIG. 15, MU STAs, such as the MU STA 1 and MU STA 2 of a BSS, perform UL MU data transmission in response to the trigger frame of an AP. In this case, another STA2 of an OBSS may not be aware of the presence of a trigger frame and/or ACK frame. In this case, another STA2 may attempt to transmit its own packet after an EIFS from the end of an UL MU frame. At this time, a collision with a DL MU ACK frame may be generated. More specifically, the influence of the collision may be further increased depending on the length of the DL MU ACK frame.

As described with reference to FIGS. 14 and 15, transmission opportunity (TXOP) protection for UL MU transmission needs to be performed. TXOP indicates the time interval in which a specific quality of service (QoS) STA has the right to initiate a frame exchange sequence on a radio medium. For the TXOP protection, a method for performing the TXOP protection using an L-SIG or sending a TXOP length in the HE-SIG-A field of a trigger frame and/or UL/DL MU frame may be used.

FIGS. 16 to 18 show the transmission of information by an STA in receive (Rx) operating mode according to an embodiment of the present invention.

In FIGS. 16 to 18, communication between an AP STA and a non-AP STA has been illustrated, for convenience of a description, but the AP STA may be a non-AP STA.

An STA may include Rx operating mode information in the MAC header or PSDU of a control frame, data frame or management frame in order to change Rx operating mode, and may send the control frame, data frame or management frame. In this case, the Rx operating mode information is mode information on which a receiver receives data, and may include at least one of channel BW information, tone information, RU information, and receiving stream number information. Furthermore, in order to indicate a request for the Rx operating mode change, Rx mode request information/bit may be additionally defined and included. The STA may indicate whether the Rx operating mode information is included in the MAC header using the reserved bits of an HT variant field or VHT variant field of the HT control field of the MAC header.

If a specific STA1 sends Rx operating mode information, whether an STA2 that has received the Rx operating mode information accepts or denies the Rx operating mode information may be indicated using a BA/ACK (or M-BA or OFDMA-BA) frame. The STA2 may send information about the acceptance or denial of the Rx operating mode information using the reserved bits of the BA and/or the ACK frame.

Alternatively, a specific STA2 may set an Rx mode request bit to 1 and transmit the Rx mode request bit in order to change Rx operating mode of the STA1. The STA1 may indicate whether it accepts or denies Rx operating mode, requested by the STA2, using a BA/ACK (or M-BA or OFDMA-BA) frame. The STA1 may send information about the acceptance or denial of the reception operating request using the reserved bits of the BA and/or the ACK frame.

In the embodiment of FIG. 16, the STA may send the Rx operating mode information while sending a data frame. The data frame may be an UL data frame or a DL data frame. The Rx operating mode information may indicate that the receiving number of spatial streams (Rx NSS)=2 and a receiving (Rx) channel bandwidth=40 MHz. An AP may indicate that it accepts the Rx operating mode information using transmitted BA. Accordingly, when the AP subsequently sends data, the AP may send data in Tx mode of Rx NSS=2 and BW=40 MHz.

In the embodiment of FIG. 17, an STA may send Rx operating mode information for changing Rx mode into Rx NSS=1 and Rx channel bandwidth =20 MHz along with a data frame. Furthermore, when an AP accepts the Rx mode change, the AP may send such Rx mode change acceptance through BA. Accordingly, the AP sends data with Rx NSS=1 and Rx channel bandwidth =20 MHz. In this case, the AP may send the Rx operating mode information for changing Rx mode into Rx NSS=3 and Rx BW=80 MHz along with the data. When the STA accepts the Rx mode change, the STA may send Rx mode change acceptance along with BA. Furthermore, the AP may send data with Nss=3 and BW=80 MHz, that is, changed reception mode.

FIG. 18 shows an embodiment in which stop/outage duration is taken into consideration in the embodiments of FIGS. 16 and 17. Furthermore, FIG. 18 shows an embodiment in which an AP requests an Rx mode change from an STA. That is, FIG. 18 shows an embodiment in which an STA sends Rx operating mode information for receiving data and an STA sends Rx operating mode information for changing operating mode of a target STA in order to send data.

When an AP sends a data frame, including Rx operating mode information, to an STA, the STA may send ACK/BA and perform an NSS and/or BSS change. Accordingly, the AP may send data after a specific time interval by taking into consideration time for an Rx mode determination or Rx mode change. Such a time may be referred to as an outage time or outage duration/interval. The outage duration means duration in which a PPDU is transmitted to an STA to which an AP/STA has sent Rx operating mode information in changed operating mode after an ACK frame is transmitted or received. As in FIG. 18, time duration in which Rx operating mode is changed may be referred to as a transition time. During such a transition time, a transmitting STA may stop data transmission.

FIG. 19 shows a multi-STA BA frame format according to an embodiment of the present invention.

In the embodiment of FIG. 19, a multi-traffic identifier (TID) BA frame includes an identifier indicating that the frame is a multi STA BA. BA information fields may be addressed to different STAs. The data of B0-B10 of a Per TID Info field may carry an AID to identify an intended receiver of a BA information field. Furthermore, an STA may define the signaling of a multi-STA BA frame indicative of ACK using the data of B11. In the embodiment of FIG. 19, when B11 is set, the BlockAck Bitmap and SC subfield of a BA Info field to be described later are not present, and the BA Info field may indicate the ACK of a single MPDU or all of MPDUs.

Referring to FIG. 19, a block ACK BA frame includes a Frame Control field, a Duration/ID field, a receive address (RA) field, a transmit address (TA) field, a BA control field, a BA information field, and a frame check sequence (FCS).

The RA field may be set as the address of an STA that has requested block ACK.

The TA field may be set as the address of an STA that sends the BA frame. subfield, a Compressed Bitmap subfield, a Reserved subfield, and a TID information (TID_Info) subfield.

Table 1 illustrates the BA control field. In Table 1, the number of bits allocated to a reserved subfield has been illustrated as being 9, but 8 bits may be allocated depending on an embodiment.

Table 1 illustrates the BA control field. In Table 1, the number of bits allocated to a reserved subfield has been illustrated as being 9, but 8 bits may be allocated depending on an embodiment.

TABLE 1

| SUBFIELD | BIT | DESCRIPTION |
| --- | --- | --- |
| BA Ack Policy | 1 | Set to "0" when a sender requests immediate Ack for data transmission. Set to "1" when a sender does not request immediate Ack for data transmission. |
| Multi-TID Compressed Bitmap | 1 1 | Indicate the type of BA frame depending on values of the Multi-TID subfield and Compressed Bitmap subfield. 00: Basic BA 01: Compressed BA |

TABLE 1-continued

| SUBFIELD | BIT | DESCRIPTION |
| --- | --- | --- |
| | | 10: Reserved value |
| | | 11: Multi-TID BA |
| Reserved | 9 | |
| TID_Info | 4 | The meaning of the TID_Info field is determined depending on the type of BA frame. Include TID in which the BA frame is transmitted in the case of the Basic BA frame and the Compressed BA frame. Include the number of TID in the case of the Multi-TID BA frame |

In the case of the Multi-TID BA frame, the BA Information field includes a repetition of a Per TID Info subfield, a Block Ack Starting Sequence Control subfield, and a Block Ack Bitmap subfield for one or more TID, and includes an increasing sequence of TIDs.

The Per TID Info subfield includes a Reserved subfield and a TID Value subfield. The TID Value subfield includes a TID value.

The Block Ack Starting Sequence Control subfield includes a Fragment Number and a Starting Sequence Number subfield as described above. The Fragment Number subfield is set to 0. The Starting Sequence Control subfield includes the sequence number of the first MSDU or A-MSDU by which a corresponding BA frame is transmitted.

The Block Ack Bitmap subfield includes a length of 8 octets. In the Block Ack Bitmap subfield, a value "1" may indicate that a single MSDU or A-MSDU corresponding to a corresponding bit position has been successfully received. A value "0" may indicate that a single MSDU or A-MSDU corresponding to a corresponding bit position has not been successfully received.

As described above, when an STA performs spatial multiplexing or does not perform spatial multiplexing, it may change the number of active Rx chains for power saving depending on the number of Rx special streams (NSS) and an Rx channel bandwidth. For such an Rx mode change, signals may be exchanged between an AP and the STA. More specifically, this specification proposes a method for transmitting and receiving information for a change of the Rx NSS and Rx BW in order to change the number of active Rx chains between an AP and an STA. Furthermore, this specification also proposes a method for changing Tx operating mode of an AP preferred by an STA for a Tx operating mode change of the AP. A method for changing operating mode, which is proposed according to an embodiment of the present invention, is described below for each item.

1. Method for Indicating Rx Operating Mode

As described above with reference to FIGS. 16 to 18, the STA2 that has received the Rx operating mode information from the STA1 may indicate whether it will accept or deny the operating mode change using the reserved bit of BA/ACK. An embodiment of the present invention additionally proposes a method for indicating another Rx operating mode to be changed by the STA1 if the STA1 denies an operating mode change.

To this end, the reserved bits of the BA control field shown in Table 1 may be used as follows. In Table 1, the reserved bits of the BA control field have been illustrated as being 9 bits, but may be 8 bits in some embodiments. An example in which the reserved bits of the BA control field are 8 bits is described below. In an embodiment, the Rx operating mode information may be configured as follows.

In this case, information about such a configuration may be used as Tx operating mode information, which will be described later.

1 bit: An indicator indicating whether the STA2 accepts or denies an operating mode change requested by the STA1.

1 bit: An indicator indicating whether the STA2 sends proper Rx operating mode information for an SAT1. This may be applied similar to the Rx mode request bit.

3 bits: The number of received spatial streams (NSS) information 3 bits: Rx channel bandwidth information In an embodiment, when the STA2 accepts an Rx operating mode change requested by the STA1, an indicator indicating whether proper Rx operating mode information has been transmitted, NSS information, and Rx channel bandwidth information may be omitted. Alternatively, when the STA2 accepts an Rx operating mode change requested by the STA1, it may send NSS information and channel bandwidth information corresponding to accepted operating mode. This may be used to confirm the Rx operating mode information transmitted by the STA1. For example, the pieces of information may be signaled additionally using the reserved bits or reserved values of the Multi-TID field, compressed bitmap field, and GCR field.

In an embodiment, the STA2 may send at least one of information about whether it accepts operating mode information requested by the STA1 or not, information about whether it has sent proper operating mode information or not, and proper operating mode information—NSS information and BW information using the BA information field of FIG. 19. For example, the STA2 may send at least one of information about whether it accepts operating mode information requested by the STA1 or not, information about whether it has sent proper operating mode information or not, and proper operating mode information-NSS information and BW information using the M-BA frame. The STA2 may previously define the TID value of the BA information field as a specific measured value (e.g., all 0 or all 1). If the TID value is set as such a specific value, the STA2 may send the aforementioned information using the Block Ack Starting Sequence Control field and/or the Block Ack Bitmap field. In other words, the STA2 may indicate that it sends new Rx operating mode using a previously defined TID value. In this case, a field included in the TID Value field instead of the Block Ack Starting Sequence Control field and/or the Block Ack Bitmap field may be newly defined as a field indicative of Rx operating mode information.

The STA2 may send new Rx operating mode information for the STA1 using the MAC header of a frame (e.g., a data frame) or BA/ACK (or M-BA or OFDMA-BA) frame transmitted by the STA2. Alternatively, the STA2 may send new operating mode information by piggybacking it on a transmission frame. In an embodiment, the Rx operating mode information may include channel information and spatial stream number information for sending, by the STA2, a trigger frame for the STA1 that will perform UL MU transmission. If a specific STA1 applies UL MU for the STA1, the STA2 may send BW or channel information and NSS information on which a next trigger frame will be transmitted to the STA1 using a BA/ACK frame, that is, a response frame for an UL data frame transmitted by the STA1, or a frame transmitted from the STA2 to the STA1. The STA1 may perform a subsequent reception operation according to Rx operating mode transmitted by the STA2.

2. Method for Indicating Tx Operating Mode

An embodiment of the present invention proposes a method for indicating Tx operating mode in addition to the transmission and reception of Rx operating information for an Rx operating mode change.

In the 802.11ax system, for a coverage extension in outdoor environments, an STA may randomly access specific resources in uplink. In this case, Tx operating mode transmitted by the STA may need to be changed. For example, only a specific STA of STAs that have performed random access may access an AP using only 26 tones. In this case, if the STA receives a trigger frame for the random access and sends an UL frame, it may send its own Tx operating mode information using the reserved bits of a field or frame (e.g., ACK/BA, data or a buffer status report) of the aforementioned MAC header. The Tx operating mode information may include at least one of maximum resource unit (RU) size information, channel bandwidth information, and NSS information.

Rx operating mode information and Tx operating mode information may be transmitted in the same format. In this case, an indication bit indicating whether corresponding information is Tx operating mode information or Rx operating mode information may be added. In an embodiment, when a value of the indication bit is 1, it may indicate that corresponding information is Tx operating mode. When a value of the indication bit is 0, it may indicate that corresponding information is Rx operating mode.

The AP that has received the Tx operating mode information from the STA may accept or deny a transmission operating mode change. When the AP schedules the UL MU transmission of the STA, it may send a trigger frame for the UL MU transmission of the STA using the Tx operating mode information received from the STA. In this case, the AP may allocate an RU unit equal to or smaller than a maximum RU size which has been transmitted by the STA and by which the AP may be accessed to the STA as the RU unit of UL MU resources of the STA. The RU unit may be allocated as a specific tone number unit according to an OFDMA scheme. For example, if the STA sends Tx operating mode information indicating that a maximum RU size by which the STA can access the AP is 52 tones, the AP may allocate UL MU resources with 26 tones or 52 tones. Furthermore, the AP may allocate the UL MU resources so that the STA can send the number of spatial streams smaller than the number of spatial streams transmitted by the STA.

3. Method for Sending Preferred RU Size Information and MCS Information or TXOP Length Value in Buffer Status Report If an STA receives a trigger frame (for random access) and makes a buffer status report, the STA may send preferred RU size (or a maximum RU size by which the STA can access an AP) information and/or preferred MCS information. The MCS information may be omitted if it is used identically with an MCS when a buffer status report is transmitted. Alternatively, the MCS information may indicate a maximum MCS level which may be used by the STA. The STA may notify the AP of the amount of buffered data by sending the RU size information and the MCS level information. For example, the STA may indicate the amount of buffered data by sending transmit opportunity (TXOP) length information determined based on the RU size information and the MCS level information. The STA may send the TXOP length information along with the RU size information and the MCS level information or may send the TXOP length information instead of the RU size information and the MCS level information.

4. Backoff Procedure

As described above, when an STA that has transmitted Rx operating mode information receives a corresponding response frame, the STA may change Rx operating mode after a predetermined outage time or during an outage time. A case where the STA sends the Rx operating mode information may include a case where the STA sends its own Rx operating mode information and a case where the STA requests Rx operating mode information about a target STA linked to the STA. Furthermore, as described above, a response frame may be a frame, such as ACK/BA, M-BA, OFDMA BA or data. In this case, a transmitting STA may defer a backoff procedure during an outage time and may perform a backoff procedure after the outage time elapses.

5. Condition in which STA sends Rx/Tx Operating Mode Information

In order for an STA to send Tx operating mode information or Rx operating mode information, an AP or the STA may manage a condition in which the transmission of Tx/Rx operating mode information by the STA is triggered. For example, if the battery of the STA is a specific threshold value or less, the AP may trigger the condition so that the STA sends Rx operating mode information. To this end, the AP may send a specific threshold value as trigger information using a beacon frame, trigger frame or management frame.

In an embodiment, an AP may allow an STA to send Rx operating mode information only if the STA can turn off an RF chain (e.g., if the RF chain changes from 160 MHz to 80 MHz). For example, the AP may allow the STA to send Rx/Tx operating mode information only in a specific interval if a beacon interval is divided into an OFDMA interval and an enhanced distributed channel access (EDCA) interval or a legacy interval and a 11ax interval. For another example, if the receive signal strength indicator (RSSI) or SNR/SNIR of a signal received from the STA is a specific threshold value or less, the AP may send trigger information (e.g., a specific threshold value) using a beacon frame, trigger frame or management frame in order to trigger the transmission of Tx operating mode information.

6. Method for Providing Notification of Rx Operating Mode Change Timing

FIG. 20 shows the transmission of Rx operating mode information and a method for sending data in Rx operating mode according to an embodiment of the present invention.

Referring to FIG. 20, an STA may send Rx operating mode information in order to change Rx operating mode into RX NSSS=2 and RX BW=40 MHz. An AP may accept the Rx operating mode information. In this case, if the AP has to send DL data for the STA, it may delay a Tx mode change for the throughput enhancement of the DL data. If the DL data of the STA is transmitted in MU, the AP may delay a Tx mode change in order to improve an MU gain. The delay time of such a mode change may also be called an outage time. In order to distinguish the outage time from the transition time of FIG. 18, the time taken to send/receive data in existing Rx operating mode without changing Rx operating mode as in FIG. 20 may be referred to as a delay time.

The delay time may indicate an interval in which a transmitting STA has received Rx operating mode information and accepted a mode change, but the transmitting STA sends data in existing Rx operating mode. Furthermore, the delay time may indicate an interval in which a receiving STA has sent Rx operating mode information and received a frame (ACK) indicative of the acceptance of a mode change, but the receiving STA receives data in existing Rx operating mode. In an embodiment, the delay time may include an interval in which data is transmitted/received in operating mode prior to a change and an interval in which a response frame (e.g., ACK) for the data is transmitted/received.

After the delay time, the AP may send a frame in mode changed based on the Rx operating mode information received from the STA. The AP may delay a change time according to the Rx operating mode information transmitted by the STA for a specific time (e.g., the delay time) using a DL frame. In this case, the AP may notify the STA of the delay time. If not, the STA, that is, the AP, may indicate that the change time according to the Rx operating mode information received from the STA is deferred for a specific time using the DL frame. The reason for this is that only when the AP notifies the STA of the delay time, the STA can delay an operating mode change and receive data in previous Rx operating mode.

The AP may notify the STA of a specific interval in which the operating mode change is deferred, and a corresponding method is as follows.

1) The AP may directly send the delay time to the STA. The AP may send the delay time to the STA along with information indicative of the acceptance of the Rx operating mode change. The delay time information may be transmitted using an MAC header, the reserved bits of a BA/ACK/M-BA/OFDMA BA frame or a specific field. The delay time information may be transmitted through a data part or field newly defined for the 802.11ax system.

2) The delay time may be previously defined. Furthermore, the AP may indicate whether the Rx operating mode transmitted by the STA will be changed after a predefined delay time or when a frame including information indicative of the acceptance of an Rx operating mode change is received using a DL frame. Examples of values which may be defined as the delay time are as follows.

a. The length of current TXOP duration
b. The length of the remaining TXOP duration (in this case, an STA may change Rx operating mode in next TXOP.)
c. Max TXOP duration length
d. Service period
e. Time left until next beacon target transmission (i.e., an STA may change Rx operating mode in a next beacon interval.)
f. Time left until next beacon target transmission (whether the time is a beacon interval after several places may be signaled.)

The AP/non-AP STA may receive the Rx operating mode information, and may send the delay time information while sending a frame indicative of the acceptance of the Rx operating mode information. The delay time information may indicate an interval (duration) until the Rx operating mode is changed. Alternatively, the delay time information may indicate one of the aforementioned values "a" to "f." Alternatively, the delay time information may indicate whether the STA will change the Rx operating mode right after receiving a frame indicative of the acceptance of the Rx operating mode or whether the STA will change the Rx operating mode after a specific time. The delay time information may further include such information.

FIG. 21 shows an STA device according to an embodiment of the present invention.

Referring to FIG. 21, the STA device may include memory 21010, a processor 21020, and an RF unit 21030. Furthermore, as described above, the STA device is an HE STA device and may be an AP or a non-AP STA.

The RF unit 21030 is connected to the processor 21020 and may send/receive a radio signal. The RF unit 21030 may up-convert data, received from the processor, into a transmission and reception band and send a resulting signal.

The processor 21020 is connected to the RF unit 21030 and may implement the physical layer and/or MAC layer according to the IEEE 802.11 system. The processor 21030 may be configured to perform operations according to the various embodiments of the present invention according to the drawings and description. Furthermore, a module for implementing the operation of the STA according to the various embodiments of the present invention may be stored in the memory 21010 and executed by the processor 21020.

The memory 21010 is connected to the processor 21020 and stores a variety of types of information for driving the processor 21020. The memory 21010 may be included in the processor 21020 or disposed outside the processor 21020 and may be connected to the processor 21020 by known means.

Furthermore, the STA device may include a single antenna or multiple antennas. The contents described in connection with the various embodiments of the present invention may be independently applied to the detailed configuration of the STA device of FIG. 21 or two or more embodiments may be applied to the detailed configuration of the STA device at the same time.

A method for transmitting and receiving data including Rx operating mode information of the STA device of FIG. 21 is described again in connection with the following flowchart.

FIG. 22 shows a method for sending, by the STA device, data according to an embodiment of the present invention.

The entire description given in connection with FIGS. 16 to 20 may be applied to FIG. 22.

An STA may receive an uplink data frame, including Rx operating mode information, from a first STA at step S22010. The Rx operating mode information is indicative of Rx operating mode to be changed by the first STA. The Rx operating mode information may include the number of received spatial streams (NSS) information and Rx channel bandwidth information. Furthermore, in some embodiments, the Rx operating mode information may include at least one of tone number information, RU information, received stream number information, and MCS information.

The STA may send an ACK frame for the received uplink data frame at step S22020. In this case, the ACK frame includes mode change acceptance information. The mode change acceptance information indicates whether an Rx operating mode change according to the received Rx operating mode information is accepted or denied. The ACK frame may be referred to as indicating all of the aforementioned BA frame, M-BA frame, and OFDMA BA frame.

If the mode change acceptance information indicates the denial of the Rx operating mode change, the ACK frame may further include second Rx operating mode information about the first STA. The second Rx operating mode may be indicative of Rx operating mode different from the Rx operating mode requested by the first STA.

For example, the uplink data frame may further include Tx operating mode information. In this case, only Tx/Rx operating mode ID information may be added, and the Rx operating mode information may be used as the Tx operating mode information. The Tx operating mode information may be indicative of Tx operating mode of the STA, which is to be received by the first STA. The Tx operating mode information may include resource unit information indicative of a resource unit size by which the first STA may access the STA.

In an embodiment, the STA may further send trigger information that instructs the first STA to send the Rx operating mode information. The first STA may send the Rx operating mode information based on the trigger information transmitted by the STA. As described above, the trigger information may be indicative of a specific threshold value related to a battery or signal intensity.

In addition to the method of FIG. 22, the STA may send data to the first STA. If the STA denies the Rx operating mode information, it may send the data in existing Tx operating mode. If the STA accepts the Rx operating mode information, it may send the data in changed operating mode. More specifically, the transmission of the data in changed operating mode may be initiated after a lapse of a delay time from the transmission of the ACK frame. Furthermore, the aforementioned ACK frame may further include delay time information indicative of the delay time. The delay time is indicative of an interval in which data is transmitted or received in operating mode prior to a change. In an embodiment, the delay time may further include a transition time in which mode is changed.

Those skilled in the art will understand that the present invention may be changed and modified in various ways without departing from the spirit or range of the present invention. Accordingly, the present invention is intended to include all the changes and modifications provided by the appended claims and equivalents thereof.

In this specification, both the apparatus and the method have been described, and the descriptions of both the apparatus and method may be mutually supplemented and applied.

MODE FOR INVENTION

Various embodiments have been described in the best mode for implementing the present invention.

INDUSTRIAL APPLICABILITY

The method for transmitting and receiving data in a wireless communication system according to the embodiments of the present invention has been illustrated as being applied to the IEEE 802.11 system, but may be applied to various wireless communication systems in addition to the IEEE 802.11 system.

The invention claimed is:

1. A method for transmitting, by an Access Point (AP), data in a wireless local area network (WLAN) system, the method comprising:
   receiving an uplink (UL) frame from a station (STA), the UL frame comprising transmitting (Tx) operating mode information indicating a Tx operating mode to be changed,
   wherein the Tx operating mode information comprises a maximum number of Tx spatial streams and a Tx channel bandwidth;
   allocating at least one frequency resource unit or at least one spatial stream to the STA based on the received Tx operating mode information,
   wherein the at least one frequency resource unit is defined in units of a predetermined number of tones, and
   wherein the predetermined number of tones is 26 or 52;
   sending a trigger frame for UL multiuser (MU) transmission, wherein the trigger frame includes resource allocation information related to at least one of the at least one frequency resource unit or the at least one spatial stream; and receiving a UL MU frame through the at least one frequency resource unit.

2. The method of claim 1, wherein the UL frame includes a medium access control (MAC) header and the first Tx operation mode information is included in the MAC header.

3. The method of claim 1, wherein the Tx operating mode information and a reception (Rx) operation mode information are of a same format.

4. An Access Point (AP) device in a wireless local area network (WLAN) system, the AP device comprising:
a transceiver transmitting and receiving a radio signal; and
a processor controlling the transceiver,
wherein the AP device is configured to:
receive an uplink (UL) frame from a station (STA), the UL frame comprising transmitting (Tx) operating mode information indicating a Tx operating mode to be changed,
wherein the Tx operating mode information comprises a maximum number of Tx spatial streams and a Tx channel bandwidth,
allocate at least one frequency resource unit or at least one spatial stream to the STA based on the received Tx operating mode information,
wherein the at least one frequency resource unit is defined in units of a predetermined number of tones, and
wherein the predetermined number of tones is 26 or 52;
send a trigger frame for UL multiuser (MU) transmission,
wherein the trigger frame includes resource allocation information related to at least one of the at least one frequency resource unit or the at least one spatial stream, and
receive a UL MU frame through the at least one frequency resource unit.

5. The AP device of claim 4, wherein the UL frame includes a medium access control (MAC) header and the first Tx operation mode information is included in the MAC header.

6. The AP device of claim 4, wherein the Tx operating mode information and a reception (Rx) operation mode information are of a same format.

7. A method for transmitting, by a Station (STA), data in a wireless local area network (WLAN) system, the method comprising:
transmitting an uplink (UL) frame to an Access Point (AP), the uplink frame comprising transmitting (Tx) operating mode information indicating a Tx operating mode to be changed,
wherein the Tx operating mode information comprises a maximum number of Tx spatial streams and a Tx channel bandwidth; and receiving a trigger frame for UL multiuser (MU) transmission,
wherein the trigger frame includes resource allocation information related to at least one of at least one frequency resource unit or at least one spatial stream for the STA;
wherein the resource allocation information is generated based on the received Tx operating mode information,
wherein the at least one frequency resource unit is defined in units of a predetermined number of tones, and
wherein the predetermined number of tones is 26 or 52; and
receiving a UL MU frame through the at least one frequency resource unit.

8. The method of claim 7, wherein the UL frame includes a medium access control (MAC) header and the first Tx operation mode information is included in the MAC header.

9. The method of claim 7, wherein the Tx operating mode information and a reception (Rx) operation mode information are of a same format.

10. A Station (STA) device in a wireless local area network (WLAN) system, the STA device comprising:
a transceiver transmitting and receiving a radio signal; and
a processor controlling the transceiver,
wherein the STA device is configured to:
transmit an uplink (UL) frame to an Access Point (AP) the UL frame comprising transmitting (Tx) operating mode information indicating a Tx operating mode to be changed,
wherein the Tx operating mode information comprises a maximum number of Tx spatial streams and a Tx channel bandwidth,
receive a trigger frame for UL multiuser (MU) transmission,
wherein the trigger frame includes resource allocation information related to at least one of at least one frequency resource unit or at least one spatial stream for the STA,
wherein the at least one resource allocation information is generated based on the received Tx operating mode information,
wherein the frequency resource unit is defined in units of a predetermined number of tones,
wherein the predetermined number of tones is 26 or 52, and
receive a UL MU frame through the at least one frequency resource unit.

11. The STA device of claim 10, wherein the UL frame includes a medium access control (MAC) header and the first Tx operation mode information is included in the MAC header.

12. The STA device of claim 10, wherein the Tx operating mode information and a reception (Rx) operation mode information are of a same format.

* * * * *